United States Patent
Merrill et al.

(10) Patent No.: US 12,265,918 B2
(45) Date of Patent: Apr. 1, 2025

(54) SYSTEMS AND METHODS FOR ENRICHING MODELING TOOLS AND INFRASTRUCTURE WITH SEMANTICS

(71) Applicant: ZestFinance, Inc., Burbank, CA (US)

(72) Inventors: Douglas C. Merrill, Burbank, CA (US); Armen Donigian, Burbank, CA (US); Eran Dvir, Burbank, CA (US); Sean Javad Kamkar, Burbank, CA (US); Evan George Kriminger, Burbank, CA (US); Vishwaesh Rajiv, Burbank, CA (US); Michael Edward Ruberry, Burbank, CA (US); Ozan Sayin, Burbank, CA (US); Yachen Yan, Burbank, CA (US); Derek Wilcox, Burbank, CA (US); John Candido, Burbank, CA (US); Benjamin Anthony Solecki, Burbank, CA (US); Jiahuan He, Burbank, CA (US); Jerome Louis Budzik, Burbank, CA (US); John J. Beahan, Jr., Burbank, CA (US); John Wickens Lamb Merrill, Burbank, CA (US); Esfandiar Alizadeh, Burbank, CA (US); Liubo Li, Burbank, CA (US); Carlos Alberta Huertas Villegas, Burbank, CA (US); Feng Li, Burbank, CA (US); Randolph Paul Sinnott, Jr., Burbank, CA (US)

(73) Assignee: ZestFinance, Inc., Burbank, CA (US)

( * ) Notice: Subject to any disclaimer, the term of this patent is extended or adjusted under 35 U.S.C. 154(b) by 0 days.

(21) Appl. No.: 18/503,312

(22) Filed: Nov. 7, 2023

(65) Prior Publication Data
US 2024/0070487 A1 Feb. 29, 2024

Related U.S. Application Data

(63) Continuation of application No. 16/394,651, filed on Apr. 25, 2019, now Pat. No. 11,847,574.
(Continued)

(51) Int. Cl.
*G06N 5/022* (2023.01)
*G06F 16/908* (2019.01)
(Continued)

(52) U.S. Cl.
CPC ........... *G06N 5/022* (2013.01); *G06F 16/908* (2019.01); *G06F 18/2115* (2023.01);
(Continued)

(58) Field of Classification Search
CPC ........ G06N 5/022; G06N 5/045; G06N 20/00; G06N 20/20; G06N 3/0454; G06N 3/088;
(Continued)

(56) References Cited

U.S. PATENT DOCUMENTS

| 525,413 A | 9/1894 | Gates |
|---|---|---|
| 5,745,654 A | 4/1998 | Titan |

(Continued)

FOREIGN PATENT DOCUMENTS

| WO | 2014014047 A1 | 1/2014 |
|---|---|---|
| WO | 2014055238 A1 | 4/2014 |

(Continued)

OTHER PUBLICATIONS

Karakoulas, G., 2004. Empirical validation of retail credit-scoring models. Rma Journal, 87, pp. 56-60.*
(Continued)

*Primary Examiner* — Zhitong Chen
(74) *Attorney, Agent, or Firm* — Troutman Pepper Locke LLP; Christopher J. Forstner; Nicholas J. Gallo

(57) ABSTRACT

Systems and methods for generating and processing modeling workflows are disclosed. In some examples, a refer-
(Continued)

ence distribution of scores generated by a model is determined. The reference distribution of scores is recorded in a structured database. One or more unexpected scores are detected during execution of the model. To detect the one or more unexpected scores, a production distribution of scores is compared with the reference distribution of scores recorded in the structured database. The production distribution of scores is generated by the model for a production input data set. An alert is then provided to an external system, when an alert condition is determined to be satisfied based on the comparison. The alert indicates detection of the one or more unexpected scores.

15 Claims, 13 Drawing Sheets

Related U.S. Application Data

(60) Provisional application No. 62/666,991, filed on May 4, 2018.

(51) Int. Cl.
*G06F 18/2115* (2023.01)
*G06F 40/44* (2020.01)
*G06N 5/045* (2023.01)
*G06N 20/00* (2019.01)
*G06Q 10/0633* (2023.01)

(52) U.S. Cl.
CPC ............ *G06F 40/44* (2020.01); *G06N 5/045* (2013.01); *G06N 20/00* (2019.01); *G06Q 10/0633* (2013.01)

(58) Field of Classification Search
CPC .... G06F 16/908; G06F 40/44; G06F 16/9027; G06F 40/284; G06F 40/56; G06K 9/6231; G06Q 10/0633
See application file for complete search history.

(56) References Cited

U.S. PATENT DOCUMENTS

| | | | |
|---|---|---|---|
| 5,999,938 A | 12/1999 | Bliss et al. |
| 6,034,314 A | 3/2000 | Koike |
| 6,877,656 B1 | 4/2005 | Jaros et al. |
| 7,035,811 B2 | 4/2006 | Gorenstein |
| 7,280,980 B1 | 10/2007 | Hoadley et al. |
| 7,467,116 B2 | 12/2008 | Wang |
| 7,499,919 B2 | 3/2009 | Meyerzon et al. |
| 7,542,993 B2 | 6/2009 | Satterfield et al. |
| 7,610,257 B1 | 10/2009 | Abrahams |
| 7,711,635 B2 | 5/2010 | Steele et al. |
| 7,765,151 B1 | 7/2010 | Williams et al. |
| 7,813,945 B2 | 10/2010 | Bonissone et al. |
| 7,873,535 B2 | 1/2011 | Umblijs et al. |
| 7,873,570 B2 | 1/2011 | Cagan et al. |
| 7,921,359 B2 | 4/2011 | Friebel |
| 7,941,363 B2 | 5/2011 | Tanaka et al. |
| 7,941,425 B2 | 5/2011 | Sahu et al. |
| 7,970,676 B2 | 6/2011 | Feinstein |
| 7,987,177 B2 | 7/2011 | Beyer et al. |
| 7,996,392 B2 | 8/2011 | Liao et al. |
| 8,078,524 B2 | 12/2011 | Crawford et al. |
| 8,086,523 B1 | 12/2011 | Palmer |
| 8,166,000 B2 | 4/2012 | Labrie et al. |
| 8,200,511 B2 | 6/2012 | Zizzamia et al. |
| 8,219,500 B2 | 7/2012 | Galbreath et al. |
| 8,280,805 B1 | 10/2012 | Abrahams |
| 8,335,741 B2 | 12/2012 | Kornegay et al. |
| 8,442,886 B1 | 5/2013 | Haggerty et al. |
| 8,452,699 B2 | 5/2013 | Crooks |
| 8,515,842 B2 | 8/2013 | Papadimitriou |
| 8,554,756 B2 | 10/2013 | Gemmell et al. |
| 8,560,436 B2 | 10/2013 | Lau et al. |
| 8,600,966 B2 | 12/2013 | Kravcik |
| 8,626,645 B1 | 1/2014 | Lazerson |
| 8,645,417 B2 | 2/2014 | Groeneveld et al. |
| 8,660,943 B1 | 2/2014 | Chirehdast |
| 8,694,401 B2 | 4/2014 | Stewart |
| 8,744,946 B2 | 6/2014 | Shelton |
| 8,799,150 B2 | 8/2014 | Annappindi |
| 9,047,392 B2 | 6/2015 | Wilkes et al. |
| 9,268,850 B2 | 2/2016 | El-Charif et al. |
| 9,405,835 B2 | 8/2016 | Wheeler et al. |
| 9,501,749 B1 | 11/2016 | Narsky |
| 9,639,805 B1 | 5/2017 | Feller |
| 9,686,863 B2 | 6/2017 | Chung et al. |
| 10,121,115 B2 | 11/2018 | Chrapko |
| 10,581,887 B1 | 3/2020 | Dinerstein |
| 10,684,598 B1 | 6/2020 | Alanqar et al. |
| 10,719,301 B1 | 7/2020 | Dasgupta et al. |
| 10,824,959 B1 | 11/2020 | Chatterjee |
| 10,977,558 B2 | 4/2021 | Herbster |
| 11,296,971 B1 | 4/2022 | Jain |
| 2002/0038277 A1 | 3/2002 | Yuan |
| 2002/0091650 A1 | 7/2002 | Ellis |
| 2002/0138414 A1 | 9/2002 | Pitman |
| 2002/0178113 A1 | 11/2002 | Clifford et al. |
| 2003/0009369 A1 | 1/2003 | Gorenstein |
| 2003/0033242 A1 | 2/2003 | Lynch et al. |
| 2003/0033587 A1 | 2/2003 | Ferguson et al. |
| 2003/0046223 A1 | 3/2003 | Crawford et al. |
| 2003/0101080 A1 | 5/2003 | Zizzamia et al. |
| 2003/0147558 A1 | 8/2003 | Loui et al. |
| 2003/0176931 A1 | 9/2003 | Pednault |
| 2004/0068509 A1 | 4/2004 | Garden et al. |
| 2004/0107161 A1 | 6/2004 | Tanaka et al. |
| 2004/0199456 A1 | 10/2004 | Flint et al. |
| 2005/0055296 A1 | 3/2005 | Hattersley et al. |
| 2005/0114279 A1 | 5/2005 | Scarborough et al. |
| 2005/0234762 A1 | 10/2005 | Pinto |
| 2005/0278246 A1 | 12/2005 | Friedman et al. |
| 2006/0047613 A1 | 3/2006 | Labreuche |
| 2006/0083214 A1 | 4/2006 | Grim, III |
| 2006/0106570 A1 | 5/2006 | Feldman |
| 2006/0112039 A1 | 5/2006 | Wang |
| 2006/0167654 A1 | 7/2006 | Keinan et al. |
| 2006/0200396 A1 | 9/2006 | Satterfield et al. |
| 2006/0218067 A1 | 9/2006 | Steele |
| 2007/0005313 A1 | 1/2007 | Sevastyanov |
| 2007/0011175 A1 | 1/2007 | Langseth |
| 2007/0016542 A1 | 1/2007 | Rosauer et al. |
| 2007/0050286 A1 | 3/2007 | Abrahams |
| 2007/0055619 A1 | 3/2007 | Abrahams et al. |
| 2007/0067284 A1 | 3/2007 | Meyerzon et al. |
| 2007/0106550 A1 | 5/2007 | Umblijs et al. |
| 2007/0112668 A1 | 5/2007 | Celano et al. |
| 2007/0124236 A1 | 5/2007 | Grichnik et al. |
| 2007/0288338 A1 | 12/2007 | Hoadley et al. |
| 2008/0133402 A1 | 6/2008 | Kurian et al. |
| 2008/0208820 A1 | 8/2008 | Usey et al. |
| 2008/0222061 A1 | 9/2008 | Soetjahja |
| 2008/0306893 A1 | 12/2008 | Saidi et al. |
| 2008/0307006 A1 | 12/2008 | Lee |
| 2009/0006283 A1 | 1/2009 | Labrie et al. |
| 2009/0006356 A1 | 1/2009 | Liao et al. |
| 2009/0015433 A1 | 1/2009 | James |
| 2009/0024517 A1 | 1/2009 | Crooks |
| 2009/0030888 A1 | 1/2009 | Sahu et al. |
| 2009/0037308 A1 | 2/2009 | Feinstein |
| 2009/0192980 A1 | 7/2009 | Beyer et al. |
| 2009/0216748 A1 | 8/2009 | Kravcik |
| 2009/0254572 A1 | 10/2009 | Redlich et al. |
| 2009/0299911 A1 | 12/2009 | Abrahams |
| 2009/0319521 A1 | 12/2009 | Groeneveld et al. |
| 2010/0005018 A1 | 1/2010 | Tidwell |
| 2010/0010878 A1 | 1/2010 | Pinto et al. |
| 2010/0010935 A1 | 1/2010 | Shelton |
| 2010/0082476 A1 | 4/2010 | Bowman |
| 2010/0257459 A1 | 10/2010 | Galbreath et al. |

(56) References Cited

U.S. PATENT DOCUMENTS

| | | |
|---|---|---|
| 2010/0325067 A1 | 12/2010 | Cagan et al. |
| 2011/0071969 A1 | 3/2011 | Doctor et al. |
| 2011/0078073 A1 | 3/2011 | Annappindi |
| 2011/0112957 A1 | 5/2011 | Ingram et al. |
| 2011/0161263 A1 | 6/2011 | Lee |
| 2011/0173116 A1 | 7/2011 | Yan |
| 2011/0178902 A1 | 7/2011 | Imrey |
| 2011/0184941 A1 | 7/2011 | El-Charif et al. |
| 2011/0320423 A1 | 12/2011 | Gemmell et al. |
| 2012/0053951 A1 | 3/2012 | Kowalchuk et al. |
| 2012/0059819 A1 | 3/2012 | Wheeler et al. |
| 2012/0066106 A1 | 3/2012 | Papadimitriou |
| 2012/0066116 A1 | 3/2012 | Kornegay et al. |
| 2012/0072029 A1 | 3/2012 | Persaud et al. |
| 2012/0082476 A1 | 4/2012 | Ito et al. |
| 2012/0239613 A1 | 9/2012 | Danciu |
| 2013/0091050 A1 | 4/2013 | Merrill |
| 2013/0103569 A1 | 4/2013 | Gopinathan |
| 2013/0138553 A1 | 5/2013 | Nikankin et al. |
| 2013/0185189 A1 | 7/2013 | Stewart |
| 2014/0012794 A1 | 1/2014 | Dillon et al. |
| 2014/0014047 A1 | 1/2014 | Garcia et al. |
| 2014/0025872 A1 | 1/2014 | Flynn |
| 2014/0052604 A9 | 2/2014 | Stewart |
| 2014/0081832 A1 | 3/2014 | Merrill et al. |
| 2014/0108665 A1 | 4/2014 | Arora |
| 2014/0122355 A1 | 5/2014 | Hardtke et al. |
| 2014/0149177 A1 | 5/2014 | Frank et al. |
| 2014/0172886 A1 | 6/2014 | Wilkes et al. |
| 2014/0180790 A1 | 6/2014 | Boal |
| 2014/0181267 A1 | 6/2014 | Wadkins |
| 2014/0310661 A1 | 10/2014 | Frederickson et al. |
| 2014/0310681 A1 | 10/2014 | Poozhiyil |
| 2015/0019912 A1 | 1/2015 | Darling et al. |
| 2015/0056229 A1 | 2/2015 | Nandy et al. |
| 2015/0081602 A1 | 3/2015 | Talley et al. |
| 2015/0161098 A1 | 6/2015 | Granshaw |
| 2015/0213361 A1 | 7/2015 | Gamon |
| 2015/0317337 A1* | 11/2015 | Edgar .................... G16H 50/70 707/751 |
| 2015/0347485 A1 | 12/2015 | Cai |
| 2015/0379428 A1 | 12/2015 | Dirac et al. |
| 2016/0042292 A1 | 2/2016 | Caplan |
| 2016/0088723 A1 | 3/2016 | Chung et al. |
| 2016/0110353 A1 | 4/2016 | Merrill et al. |
| 2016/0132787 A1 | 5/2016 | Drevo et al. |
| 2016/0300252 A1 | 10/2016 | Frank et al. |
| 2016/0371238 A1 | 12/2016 | Heavenrich |
| 2017/0061326 A1 | 3/2017 | Talathi et al. |
| 2017/0109657 A1* | 4/2017 | Marcu .................... G06N 5/047 |
| 2017/0124464 A1 | 5/2017 | Crabtree et al. |
| 2017/0140518 A1 | 5/2017 | Liang et al. |
| 2017/0220633 A1 | 8/2017 | Porath |
| 2017/0222960 A1 | 8/2017 | Agarwal et al. |
| 2017/0316311 A1 | 11/2017 | Pilly |
| 2017/0330058 A1 | 11/2017 | Silberman et al. |
| 2018/0018578 A1 | 1/2018 | Yoshizumi |
| 2018/0025273 A1 | 1/2018 | Jordan |
| 2018/0060738 A1 | 3/2018 | Achin |
| 2018/0068219 A1 | 3/2018 | Turner et al. |
| 2018/0268262 A1 | 9/2018 | Osada |
| 2018/0293712 A1 | 10/2018 | Vogels et al. |
| 2018/0322406 A1 | 11/2018 | Merrill et al. |
| 2018/0349986 A1 | 12/2018 | Fidanza |
| 2019/0042887 A1 | 2/2019 | Nguyen |
| 2019/0043070 A1 | 2/2019 | Merrill et al. |
| 2019/0114704 A1 | 4/2019 | Way |
| 2019/0228006 A1 | 7/2019 | Tormasov et al. |
| 2019/0244122 A1 | 8/2019 | Li |
| 2019/0279111 A1 | 9/2019 | Merrill et al. |
| 2019/0287025 A1 | 9/2019 | Perez |
| 2019/0303404 A1 | 10/2019 | Amer |
| 2019/0311298 A1 | 10/2019 | Kopp et al. |
| 2019/0318202 A1 | 10/2019 | Zhao |
| 2019/0318421 A1 | 10/2019 | Lyonnet |
| 2019/0325514 A1 | 10/2019 | Hong |
| 2019/0340518 A1 | 11/2019 | Merrill |
| 2019/0340684 A1 | 11/2019 | Belanger et al. |
| 2019/0354806 A1 | 11/2019 | Chhabra |
| 2019/0354853 A1 | 11/2019 | Zoldi |
| 2019/0378210 A1 | 12/2019 | Merrill et al. |
| 2020/0005136 A1 | 1/2020 | Spryn |
| 2020/0012917 A1 | 1/2020 | Pham et al. |
| 2020/0082299 A1 | 3/2020 | Vasconcelos |
| 2020/0160177 A1 | 5/2020 | Durand |
| 2020/0175586 A1 | 6/2020 | Mckenna |
| 2020/0183047 A1 | 6/2020 | Denli et al. |
| 2020/0231466 A1 | 7/2020 | Lu |
| 2020/0242492 A1 | 7/2020 | Goel |
| 2020/0257927 A1 | 8/2020 | Nomi |
| 2020/0257961 A1 | 8/2020 | Hua et al. |
| 2021/0019603 A1 | 1/2021 | Friedman |
| 2021/0133631 A1 | 5/2021 | Prendki |
| 2021/0209688 A1 | 7/2021 | Krishnamurthy |
| 2021/0224605 A1 | 7/2021 | Zhang |
| 2021/0256392 A1 | 8/2021 | Zhengzhang |
| 2021/0281491 A1 | 9/2021 | Yelahanka Raghuprasad |
| 2021/0406815 A1 | 12/2021 | Mimassi |
| 2022/0019741 A1 | 1/2022 | Roy |
| 2022/0122171 A1 | 4/2022 | Hubard |
| 2022/0188519 A1 | 6/2022 | Briody |
| 2022/0188568 A1 | 6/2022 | Singh |
| 2022/0191332 A1 | 6/2022 | Ahmadi |

FOREIGN PATENT DOCUMENTS

| | | |
|---|---|---|
| WO | 2014121019 A1 | 8/2014 |
| WO | 2014184381 A2 | 11/2014 |
| WO | 2015056229 A1 | 4/2015 |
| WO | 2015081160 A1 | 6/2015 |
| WO | 2019028179 A1 | 2/2019 |

OTHER PUBLICATIONS

Dong Yue et al, "Threaded ensembles of autoencoders for stream learning : Neural Networks for Stream Learning", Computational Intelligence, vol. 34, No. 1, doi:10.1111/coin.12146, ISSN 0824-7935, (Feb. 1, 2018), pp. 261-281, URL: https://api.wiley.com/onlinelibrary/tdm/v1/articles/10.1111%2Fcoin.12146, XP055925516 (Absract).

European Extended Search Report issued in EP19796824.1, dated Jun. 13, 2022, 9 pages.

International Preliminary Report on Patentability in International Appln. No. PCT/US2019/029148, dated Nov. 19, 2020, 6 pages.

Li, Hongxiang, et al. "A novel method for credit scoring based on feature transformation and ensemble model." PeerJ Computer Science 7 (2021): e579. 19 pages.

Office Action (Final Rejection) dated Dec. 7, 2022 for U.S. Appl. No. 16/688,789 (pp. 1-24).

Office Action (Non-Final Rejection) dated Oct. 28, 2022 for U.S. Appl. No. 17/389,789 (pp. 1-19).

Office Action (Non-Final Rejection) dated Dec. 8, 2022 for U.S. Appl. No. 17/147,025 (pp. 1-20).

Wei Min et al, "Behavior Language Processing with Graph based Feature Generation for Fraud Detection in Online Lending Behavior Language Processing with Graph based Feature Generation for Fraud Detection in Online Lending", Proceedings of WSDM workshop on Misinformation and Misbehavior Mining on the Web, (Jan. 1, 2018), URL: https://web.archive.org/web/20180329125033if_/http://snap.stanford.edu:80/mis2/files/MIS2_paper_26.pdf, (Aug. 7, 2019), XP055611538, 8 pages.

Office Action (Final Rejection) dated Aug. 16, 2022 for U.S. Appl. No. 15/977,105 (pp. 1-17).

Office Action (Non-Final Rejection) dated Aug. 1, 2022 for U.S. Appl. No. 16/052,293 (pp. 1-15).

Office Action (Non-Final Rejection) dated Sep. 15, 2022 for U.S. Appl. No. 17/535,511 (pp. 1-11).

Office Action (Non-Final Rejection) dated Sep. 22, 2022 for U.S. Appl. No. 17/223,698 (pp. 1-8).

(56) References Cited

OTHER PUBLICATIONS

Boris Sharchilev et al: "Finding Influential Training Samples for Gradient Boosted Decision Trees", Arxiv.org, Cornell University Library, 201 Olin Library Cornell University Ithaca, NY 14853, Feb. 19, 2018 (Feb. 19, 2018), XP081223129, 10 pages.
European Extended Search Report issued in EP19764112.9, dated Jun. 27, 2022, 11 pages.
European Extended Search Report issued in EP19764112.9, dated Mar. 24, 2022, 14 pages.
Kang et al., "A novel credit scoring framework for auto loan using an imbalanced-learning-based reject inference". 2019 IEEE Conference on Computational Intelligence for Financial Engineering & Economics (CIFEr). May 4-5, 2019. DOI: 10.1109/CIFEr 2019. 8759110, 8 pages (Year: 2019).
Marco Ancona et al: "Towards better understanding of gradient-based attribution methods for Deep Neural Networks", Arxiv.Org, Cornell University Library, 201 Olin Library Cornell University Ithaca, NY 14853, Mar. 7, 2018 (Mar. 7, 2018), XP081506780, 16 pages.
Mukund Sundararajan et al: "Axiomatic Attribution for Deep Networks", Arxiv.org, Cornell University Library, 201 Olin Library Cornell University Ithaca, NY 14853, Mar. 4, 2017 (Mar. 4, 2017), XP080754192, 10 pages.
Office Action (Non-Final Rejection) dated May 24, 2022 for U.S. Appl. No. 16/688,789 (pp. 1-17).
Office Action (Non-Final Rejection) dated Jun. 24, 2022 for U.S. Appl. No. 17/385,452 (pp. 1-14).
Wikipedia entry on "Autoencoder". https://en.wikipedia.org/wiki/Autoencoder Downloaded Jun. 15, 2022 (Year: 2022).
Office Action (Non-Final Rejection) dated Mar. 2, 2022 for U.S. Appl. No. 16/434,731 (pp. 1-6).
"Bit Array", Wikipedia Search, May 5, 2021 at https://en.wikipedia.org/wiki/Bit_array.
Genetic algorithm, Wikipedia Search, May 5, 2021 at https://en.wikipedia.org/wiki/Gentic_algorithm.
International Search Report and the Written Opinion, Application No. PCT/US14/014047, dated May 5, 2014.
"Feature Selection" from Wikipedia and obtained in the Wayback machine at URL "https://en.wikipedia.org/wiki/Feature_selection" for Feb. 25, 2021.
"On the Convergence of Generalized Hill Climbing Algorithms" by A.W. Johnson et al. copyright 2002, Elsevier Science B.V., Discrete Applied Mathematics (Year: 2002).
"Feature Selection", Wikipedia and obtained in the Wayback machine at URL http://en.wikipedia.org/wiki/Feature_selection, Sep. 1, 2011.
Bittencourt, H.R. et al., "Feature Selection by Using Classification and Regression Trees (CART)", dated Aug. 23, 2004.
Chen, Jiahao, Fair lending needs explainable models for responsible recommendation Proceedings of the Second Workshop on Responsible Recommendation, 2018 (Year: 2018).
Data Bias and Algorithmic Discrimination University of Montreal, 2017 (Year: 2017).
Demaine, Erik D., et al., "Correlation clustering in general weighted graphs", Theoretical Computer Science 361 2006)172-187.
Gates, Susan Wharton et al., 4/3 Automated Underwriting: Friend or Foe to Low-Mod Households and Neighborhoods? Building Assets, Building Credit, Symposium, Nov. 2003 (Year: 2003).
International Preliminary Report on Patentability dated Aug. 4, 2015 in corresponding PCT Application No. PCT/US2014/014047.
International Preliminary Report on Patentability issued in PCT/US2013/060208, dated Mar. 24, 2015, 8 pages.
International Search Report and Written Opinion for application No. PCT/US20/062271 dated Feb. 26, 2021.
International Search Report and Written Opinion issued in PCT/US2020/062235, dated Mar. 10, 2021, 8 pages.
International Search Report and Written Opinion issued in PCT/US2020/062271, dated Feb. 26, 2021, 8 pages.
International Search Report dated May 5, 2014 in corresponding PCT Application No. PCT/US2014/014047.
International Search Report issued in PCT/US2013/060208, dated Jan. 7, 2014, 2 pages.
Ivanov, Alexei, et al., "Kolmogorov-Smirnov test for feature selection in emotion recognition from speech", IEEE International Conference on acoustics, speech and signal processing (ICASSP), 2012, pp. 5125-5128.
Mondarres, Ceena et al., Towards Explainable Deep Learning for Credit Lending: A Case Study Proc. Workshop Challenges Opportunities AI Financial Services: Impact Fairness Explainability Accuracy Privacy (NIPS), 2018 ( Year: 2018).
Office Action (Final Rejection) dated Nov. 18, 2021 for U.S. Appl. No. 16/052,293 (pp. 1-18).
Office Action (Final Rejection) dated Dec. 7, 2021 for U.S. Appl. No. 16/109,545 (pp. 1-17).
Office Action (Non-Final Rejection) dated Dec. 16, 2021 for U.S. Appl. No. 15/977,105 (pp. 1-19).
Office Action (Notice of Allowance and Fees Due (PTOL-85)) dated Nov. 19, 2021 for U.S. Appl. No. 16/292,844 (pp. 1-8).
Ribeiro, Marco Tulio et al., Why Should I Trust You?—Explaining Predictions of Any Classifier ACM, 2016 (Year: 2016).
Strobl, Carolin , et al., "Conditional Variable Importance for Random Forests", BMC Bioinformatics 2008, 9:307, published Jul. 11, 2008.
Tuv, Eugene , et al., "Feature Selection with Ensembles, Artificial Variables, and Redundancy Elimination", Journal of Machine Learning Research, pp. 1341-1366, Jul. 2009.
Wattenber, Martin et al., Attacking discrimination with smarter machine learning Google Research, 2016 (Year: 2016).
Zhang, et al., 2018. "Mitigating Unwanted Biases with Adversarial Learning," In Proceedings of the 2018 AAAI/ACM Conference on AI, Ethics, and Society (AIES '18). Association for Computing Machinery, New York, NY, USA, 335-340.
Zhao, Zheng , et al., "On Similarity Preserving Feature Selection", IEEE Transactions on Knowledge and Data Engineering 25,2011, pp. 619-632.
Ward, et al., "An exploration of the influence of path choice in game-theoretic attribuution algorithms," Journal of Machine Learning Research Under Review (2020), 21 pages.
International Search Report and Written Opinion for application No. PCT/US20/062235, dated Mar. 10, 2021.
"International Search Report and Written Opinion of the ISA, dated Sep. 16, 2019, for application No. PCT/US19/029148."
"International Search Report and Written Opinion of the ISA, dated Aug. 23, 2019, for application No. PCT/US19/036049."
Strumbelj, Eric , et al., "An Efficient Explanation of Individual Classifications using Game Theory", Journal of Machine Learning Research 11 (2010) 1-18.
"International Search Report and Written Opinion of the ISA, dated Jul. 5, 2019, for application No. PCT/US19/021381."
Breiman, Leo , et al., "Random Forests", Machine Learning, 45, 5-32, 2001.
Kamkar, Sean Javad, "Mesh Adaption Strategies for Vortex-Dominated Flows", Standard University, Feb. 2011.
Louppe, Gilles , et al., "Learning to Pivot with Adversarial Networks", 31st Conference on Neural Information Processing Systems (NIPS 2017), Long Beach, CA, USA, https://papers.nips.cc/paper/6699-learning-to-pivot-with-adversarial-networks.pdf.
Lundberg, Scott M., et al., "A Unified Approach to Interpreting Model Predictions", 31st Conference on Neural Information Processing Systems (NIPS 2017), Long Beach, CA, USA, Nov. 25, 2017.
Lundberg, Scott M., et al., "Consistent Individualized Feature Attribution for Tree Ensembles", University of Washington, Mar. 7, 2019.
Modares, Ceena , et al., "Towards Explainable Deep Learning for Credit Lending: A Case Study", arXiv:1811.06471v2 [cs.LG], Nov. 30, 2018.
Richardson, L. F. , "The approximate arithmetical solution by finite differences of physical problems including differential equations, with an application to the stresses in a masonry dam", Philosophical Transactions of the Royal Society A. 210 (459-470): 307-357. doi:10.1098/rsta.1911.0009, Nov. 2, 1909.

(56) References Cited

OTHER PUBLICATIONS

Richardson, L. F., "The deferred approach to the limit", Philosophical Transactions of the Royal Society A. 226 (636-646): 299-349. doi:10.1098/rsta. 1927.0008, Oct. 14, 1926.
Tonk, Stijn, "Towards fairness in ML with adversarial networks", https://blog.godatadriven.com/fairness-in-ml, Apr. 27, 2019.
International Search Report and Written Opinion of the ISA for application No. PCT/20/23370 dated Jun. 18, 2020.
"ZestFinance releases new software tool to reduce bias in AI-powered credit scoring models: New fairness filter can put 170,000 more minority families into homes", Mar. 19, 2019, PR Newswire.
Nesiba, Reynold F., "The Color of Credit: Mortgage Discrimination, Research Methodology, and Fair-Lending Enforcement", Journal of Economic Issues, 37 (3), 813-815, 2003.
Johnson, Kristen, et al., "Artificial Intelligence, Machine Learning, and Bias in Finance: Toward Responsible Innovation", Fordham Law Review, Volume **, Issue 2, Article 5, 2019, pp. 499-529.
Lippert, John, "ZestFinance Issues small, high-rate loans, uses big data to weed out deadbeats", The Washington Post, Oct. 12, 2014.
Tonk, Stijn, "Towards fairness in ML with adversarial networks", http://godatadriven.com/, Apr. 27, 2019.
Abadi, Martin, et al., "TensorFlow: Large-Scale Machine Learning on Heterogeneous Distributed Systems", Preliminary White Paper, Nov. 9, 2015.
Chen, Tianqi, et al., "XGBoost: A Scalable Tree Boosting System", KDD '16, Aug. 13-17, 2016, San Francisco, CA, USA.
Cortes, Corinna, et al., "Support-Vector Networks", AT&T Labs-Research, USA, Journal Machine Learning, vol. 20, Issue 3, Sep. 1995.
Friedman, Jerome H., "Greedy Function Approximation: A Gradient Boosting Machine", IMS 1999 Reitz Lecture, Feb. 24, 1999.
Garcia-Pedradas, Nicolas, et al., "Nonlinear Boosting Projections for Ensemble Contruction", Journal of Machine Learning Research 8 (2007) 1-33.
Geurts, Pierre, et al., "Extremely randomized trees", Springer Science + Business Media, Inc., rec'd Jun. 14, 2005, pub. online Mar. 2, 2006.
Merrill, John W. L., et al., "Generalized Integrated Gradients: A practical method for explaining diverse ensembles", Journal of Machine Learning Research Under Review (2019).
Merrill, Douglas C, et al., "Systems and Methods for Decomposition of Non-Differentiable and Differentiable Models", U.S. Appl. No. 16/434,731, file Jun. 7, 2019.
Merrill, Douglas C, et al., "Systems and Methods for Enriching Modeling Tools and Infrastructure with Semantics", U.S. Appl. No. 16/394,651, filed Apr. 25, 2019.
Rumelhart, David E., et al., "Learning representations by back-propagating errors", Nature vol. 323, Oct. 9, 1986.
Shapley, L. S., "A Value For n-Person Games", p. 295, The Rand Corporation, Mar. 18, 1952.
Wolpert, David H., "Stacked Generalization", Original contribution: Stacked generalization. Neural Netw., 5(2):241{259, Feb. 1992.
Extended European Search Report in related EP Application No. EP23154444.6, mailed Mar. 16, 2023 (8 pages).
Bean, D.M. et al., "Knowledge graph prediction of unknown adverse drug reactions and validation in electronic health records," Scientific reports, 2017, 7(1), pp. 1-11.
Zhao, Q. et al., "Construction and application research of knowledge graph in aviation risk field," In MATEC Web of Conferences (vol. 151, p. 05003), EDP Sciences, 2018.
Min, W. et al., "Behavior language processing with graph based feature generation for fraud detection in online lending," In Proceedings of workshop on misinformation and misbehavior mining on the web (Jan. 2018).
Gehrlein, William et al., A two-stage least cost credit scoring model, 1997, Annals of Operations Research, pp. 159-171.
International Search Report and Written Opinion for International Application No. PCT/US18/030966, mailed Jul. 20, 2018.
"International Search Report and the Written Opinion for Application No. PCT/US18/44874, mailed Oct. 10, 2018", Oct. 10, 2018.
Saabas, Ando, "Diving into data, A blog on machine learning, data mining and visualization, Interpreting random forests", http://blog.datadive.net/interpreting-random-forests/ (spec), Oct. 19, 2014.
Sundararajan, Mukund, et al., "Axiomatic Attribution for Deep Networks", Proceeding of the 34th International Conference on Machine Learning, Sydney, Australia, PMLR 70, Jun. 13, 2017.
Saabas, Ando, "Diving into data, A blog on machine learning, data mining and visualization, Random forest interpretation with scikit-learn", http://blog.datadive.net/random-forest-interpretation-with-scikit-learn/ (spec), Aug. 12, 2015.
Saabas, Ando, "Diving into data, A blog on machine learning, data mining and visualization, Random forest interpretation—conditional feature contributions", http://blog.datadive.net/random-forest-interpretation-conditional-feature-contributions/ (spec), Oct. 26, 2016.
Wei Min, Zhengyang Tang, Min Zhu, Yuxi Dai, Yan Wei, and Ruinan Zhang. 2018. "Behavior Language Processing with Graph based Feature Generation for Fraud Detection in Online Learning". In Proceedings of WSDM workshop on Misinformation and Misbehavior Mining on the Web, Marina Del Rey, CA, USA, 2018 (MIS2), 8 Pages. DOI: 10.475/123_4.
Communication pursuant to Article 94(3) EPC dated Jul. 8, 2024 issued in European Application No. 19796824.1.

* cited by examiner

```
Feature Stability OverTime 620

/ Determine whether each feature is stable between train and test

DSK.FeatureStabilityOverTime(POCFeatureSet) <- {

For each feature F in POCFeatureSet if F.type == numeric then

F.PSI(F.trainRange,F.testRange) <-

DSK.computePSI(POCFeatureSet.getRows(F, F.trainRange),

POCFeatureSet.getRows(F, F.testRange))

F.medianVec <- DSK.computeMedianVector(F)

else

F.chiSquared(F.trainRange,F.testRange) <-

DSK.computeX2(POCFeatureSet.getRows(F, F.trainRange),

POCFeatureSet.getRows(F, F.testRange))

CollateralValue is a pass through feature generated from POCDataSet.CollateralValue. It had a large shift in the median between 1/1/2010 and 2/1/2010. The following chart shows the median over time:

LoanToValue is the LoanAmount / CollateralValue. LoanToValue was found to have a stable distribution over time. The following...

Story Template: MRM: Feature Safety 803

For each feature F in POCFeatureSet

If (len(F.provenance) == 1) { print "$F.name is a $F.method of $F.Provenance."

} else { print "$F.name is a combination of $F.Provenance computed by $F.method."

}

If (F.PSI && max(F.PSI) >= POCFeatureSet.PSILargeThreshold) { print "$F.name had a large shift in distribution. The PSI shifted between $F.stabilityStatisticBegin and $F.stabilityStatisticEnd"
    }
    ...

FIGURE 10

```
Execute MRM module S221

Identify variables used by a model of the workflow S1101

Retrieve data sets S1102

Retrieve model scores S1103

Generate a distribution of values of at least one variable of training input data sets S1110

Generate a distribution of values of at least one variable of validation input data sets S1120

Generate a distribution of values of at least one variable of production input data sets S1130

Generate a distribution of scores generated for validation input data sets S1140

Generate a distribution of scores generated for production input data sets S1150

Generate distribution comparison information S1160

Generate MRM documentation S1170
```

FIGURE 11

SYSTEMS AND METHODS FOR ENRICHING MODELING TOOLS AND INFRASTRUCTURE WITH SEMANTICS

CROSS-REFERENCE TO RELATED APPLICATIONS

This application is a continuation of, and claims priority under 35 U.S.C. § 120 to, U.S. patent application Ser. No. 16/394,651, filed Apr. 25, 2019, which claims the benefit of U.S. Provisional Application No. 62/666,991 filed May 4, 2018, the entire contents of which are fully incorporated herein by reference.

TECHNICAL FIELD

This disclosure relates generally to the machine learning field, and more specifically to new and useful systems and methods for machine learning model development and management.

BACKGROUND

Machine learning models undergo a life cycle comprising steps such as: data preparation, model development, model testing, business analysis and risk assessment/verification, compliance analysis, production deployment, and production operations/monitoring.

There is a need in the machine learning field for new and useful systems for storing, updating, managing and using machine learning model metadata and statistics across the machine learning model lifecycle. There is a further need for automated tools that operate on machine learning model metadata and statistics to automate cumbersome, manual, time-consuming, and error-prone steps of the model development and verification process. Tools are also needed to generate the required model risk management documentation and analysis artifacts.

SUMMARY

This disclosure relates generally to the machine learning field, and more specifically to new and useful systems and methods for machine learning model development, automated model documentation, machine learning model operationalization and deployment, and run-time/operational monitoring of machine learning models, by using a knowledge graph that stores structured representations of development and validation data, the modeling process, and the resulting model, which enables new and useful systems and methods for modeling tools to reason about the model and modeling process, automate steps in the modeling process, produce automated model analyses, documentation and monitoring tools, and to substantially automate the Model Risk Management framework described in OCC Bulletin 2011-12, Supervisory Guidance on Model Risk Management.

The disclosure herein provides new and useful systems for automatically generating declarative, structured, and machine-readable descriptions of models, features, and analyses which can be used to automate common modeler tasks and to automatically create model governance and model risk management documentation throughout the modeling life cycle. The disclosure herein further provides new and useful systems for automating substantial portions of model safety analysis, including, for example, analysis of variable and feature safety (FIG. 12), model stability analysis, swap set analysis, model comparison, economic impact analysis and fair lending analysis. The disclosure herein further provides new and useful systems for recording the inputs and outputs of such analysis so that documentation can be automatically generated from stored metadata and statistics, including documentation of the form of charts, graphs, tables, and natural language narrative descriptions.

The disclosure herein provides new and useful systems for storing model metadata so that the disclosed systems can automatically monitor models based on metadata created during model development and deployment. Modelers build machine learning models to perform a specific business objective, and models are built with constraints and assumptions. For example, a modeler will present training data to a machine learning algorithm such as a neural network to train a model to predict an outcome based on input data. The training data may be comprised of multiple data fields, and each data field may be a numeric or a categorical variable or other variable type. Each data field within the training data has a distribution—for example, there may be more low-income applicants in the training dataset than high-income applicants. It is often expected that the model will be presented with input data drawn from the same distribution when it begins operating in production to make predictions. In this way, the modeling process creates expectations about model operation in production. The input data distributions comprise useful metadata that can be used by a machine learning model execution engine to monitor for anomalous values when the model is operationalized and receives new data in production. For example, if a model was trained on data that had more low-income than high-income applicants, and after the model is released, it receives more high-income than low-income applicants, an intelligent model execution engine might raise an alert that the model is receiving a different character of applicants than it was created to process. Likewise, a model can be observed to create a distribution of scores when it is validated. For example, if the model produced mostly high scores during validation, and after the model is released, it mostly produces low scores for new applicants, an intelligent model monitoring system could raise an alert that the model is producing unexpected outputs. The present disclosure provides new and useful methods for enabling model risk monitoring by leveraging a knowledge graph and automated model explainability tools that allow the modeling infrastructure to detect and explain anomalies.

In a similar way, performance projections are produced to understand the financial or operational results of running a machine learning model in production. A model may be used in a variety of business contexts, including, without limitation: credit underwriting, marketing automation, automated trading, automated radiology and medical diagnosis, call center quality monitoring, interactive voice response, video labeling, transaction monitoring for fraud, inventory projection, reserve projection and other applications. Effective model development process requires the expected operational impact of using a machine learning model in a given business application be determined before a model is put into production. This analysis is often manual, time consuming, error-prone and laborious, requiring significant effort. Moreover, the information created in the analysis is often only available in the form of reports and charts that are not accessible to systems and machinery. The present disclosure teaches how a machine learning modeling and analysis tools can be constructed to capture structured information about model performance projection and analysis and how a system can be constructed to use these metadata to power new and useful production model monitoring systems.

For example, in a credit underwriting application of a machine learning model, it is useful to examine: whether input variables are consistently available across segments, whether input variables are too highly correlated with the target, and whether input variables contain significant anomalies in their distributions over time and across training and validation datasets. The same analysis is conducted with respect to engineered features that are computable functions of the input data. This process establishes the distribution of the input data and features used in a model. It creates expectations about the input data which can be stored as metadata associated with a modeling project. This metadata can then be used to automatically generate model risk management documentation, and it can also be used to monitor a model in use in production. If a model receives inputs that do not appear to be drawn from a distributions that are similar to those observed during model creation, the model server can raise an alert. Other modeling steps and analysis steps may similarly be recorded and used in later steps for documentation and for monitoring.

The foregoing examples illustrate how modelers and the businesses that employ them have expectations about model performance and operating characteristics (input requirements, distributions of input variables, feature distributions, score distributions, business outcomes, etc.) based on analysis performed during the model development process and based on the model validation process used to determine whether a model is suitable for production use, whatever the business application.

The present disclosure reduces to practice systems and methods to store the analysis and metadata generated during model build and evaluation processes, and associate this metadata with models as they are published into production, enabling intelligent cloud applications that know how a model is intended to behave and therefore can monitor for anomalies in the model's operation, such as: unexpected input data, and unexpected output scores and generate new and useful insights into model safety in production. The present disclosure describes automated systems and methods for monitoring production model operations based on the expectations generated during the modeling process and recorded in a knowledge graph as structured metadata.

The present disclosure reduces to practice systems and methods to record steps in input variable distribution analysis, feature engineering, model train and tune, model stability over time, model comparison, champion/challenger analysis, compliance analysis, including, without limitation, fair lending analysis required to comply with the Equal Credit Opportunity Act of 1974 (15 U.S.C. § 1691 et seq.), sensitivity analysis, partial dependence plots, economic impact analysis, and substantial modeler decision points and analyses. The present disclosure reduces to practice systems and methods for automatically generating documentation from stored metadata, including documentation of the form of charts, graphs, visualizations, tables, and natural language narrative descriptions enabling a credit risk modeler with ordinary skill in the art to understand and reproduce the model.

The disclosed automated documentation capabilities combined with model monitoring functionality capabilities described herein, comprise new and useful systems and methods that can be used to help businesses substantially comply with OCC Bulletin 2011-12, Supervisory Guidance on Model Risk Management, which is incorporated herein by reference.

BRIEF DESCRIPTION OF THE FIGURES

FIG. 7 is a diagram depicting a knowledge graph node, according to embodiments;
FIG. 10 is a depiction of a story template, according to embodiments.
FIG. 11 is a representation of a method, according to embodiments.

DESCRIPTION OF EMBODIMENTS

The following description of embodiments is not intended to limit the disclosure to these embodiments, but rather to enable any person skilled in the art to make and use the embodiments disclosed herein.

1. Overview

Systems and methods for enriching modeling tools and infrastructure with descriptive metadata and semantics are provided.

Some embodiments disclosed herein provide libraries and tools that allow an operator to perform modeling and analysis tasks that record data in a knowledge graph, including tasks such as allowing an operator to flag unreliable variables and features, for instance: features that are largely missing, extremely low variance, or that have large shifts in distribution over time; flagging of features that lead to disparities in approval rate between protected classes and a baseline; blindspot analysis, including comparison of distributions of each feature in the population that would be newly approved by the model with the distributions of the same feature within the population of applicants that would have been approved by both the old model and the new model; adverse action analysis, including analysis of the frequency and distribution of adverse actions within various populations defined by the model comparison; disparate impact analysis, including identification of protected class status, comparison of approval rates between protected classes, determination of which features contribute to disparity, and a quantification of a feature's contribution to the approval rate disparity as well as their contribution to the economics of the model; and other analysis, without limitation.

In some embodiments the foregoing analyses are automated. For example, a modeling system can automate the analysis of which input variables are safe to use for modeling.

Figure 12:
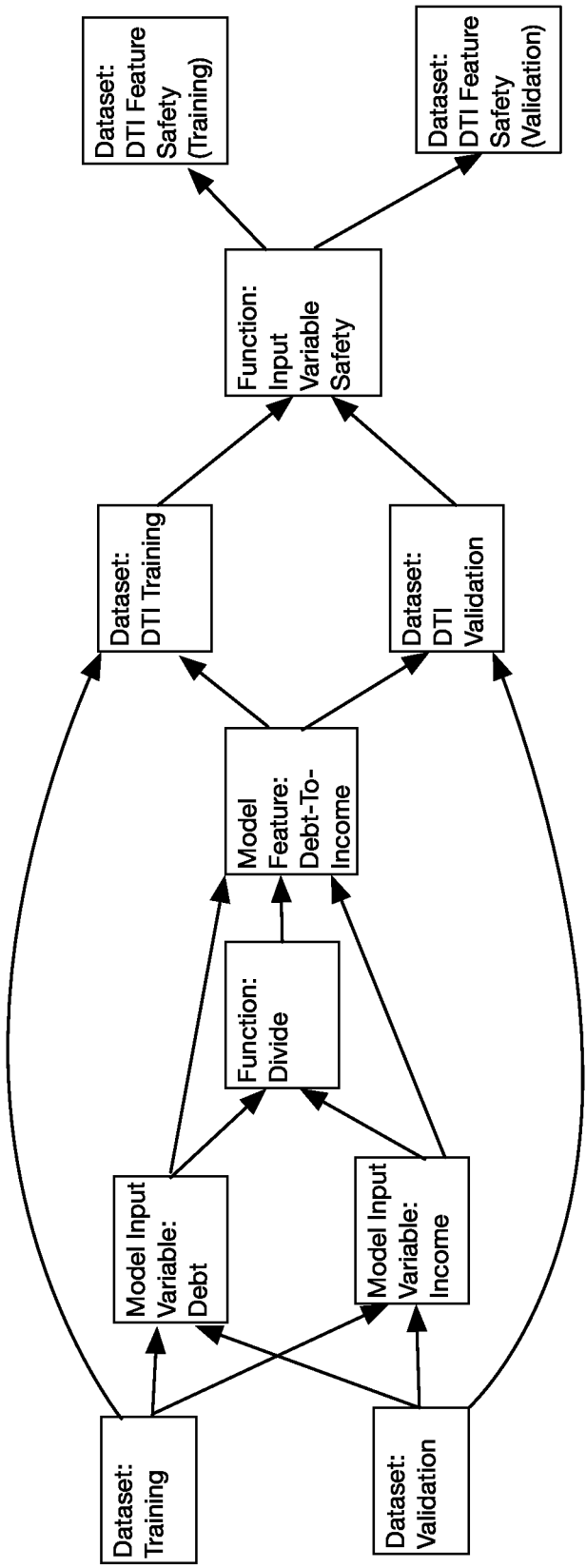
FIG. 12 is a diagram depicting a knowledge graph, according to embodiments.

FIG. 12 is a diagram depicting a knowledge graph, according to embodiments.

In some embodiments a modeling system is comprised of a model development environment which allows an operator to input and execute instructions in a programming language such as R, python or other functional or von Neumann language, communicatively coupled via a network to a knowledge graph server which is comprised of an application programming interface and storage engine such as an RDBMS, NOSQL, or filer wrapped with web services comprised of a web server and application layer that enables the modeling system. In some embodiments the operator can cause the modeling system to create, read, update, delete, and query the knowledge graph by invoking analysis functions which further invoke API calls to the knowledge graph server to create labeled nodes and edges, identify a node or an edge via a unique identifier, and return subgraphs containing metadata and relationships based on an input query transmitted via the network to the knowledge graph API. In some embodiments, the knowledge graph is comprised of nodes, and each node contains keys and values, each key is a string or symbol, each value a symbol, string, numeric, vector, or associative array. In some embodiments, the knowledge graph is comprised of edges relating at least two nodes, and in some embodiments the edges contain keys and values, each key a string or symbol, each value a symbol, string, numeric, vector, or associative array. In some embodiments the knowledge graph is represented as a series of JSON objects. In some embodiments, the knowledge graph server implements REST-based web services. In some embodiments, the knowledge graph server contains nodes and edges comprised of JSON structures stored in a data store accessed based on a hierarchical path. In some embodiments the API implements data operations such as: copy node, copy subgraph, subgraph versioning, batch processing, and function evaluation. In some embodiments the API implements user- and group-level access control, and is integrated with enterprise directory and authentication services. In other embodiments the knowledge graph server is communicatively coupled with a distributed storage and processing system such as HDFS and Hadoop or Spark, which may be invoked for processing of knowledge graph data and population of the knowledge graph with outputs from batch or real-time processing work resulting from the invocation. In some embodiments, the knowledge graph provides APIs for registering a function and evaluating the function on data stored in the knowledge graph. First: an operator creates a function, such as, for example, by creating an implementation of median in a programming language such as R or Python; next, the operator registers the function with the knowledge graph via an API that specifies the function's input requirements (in this case, a vector of numerics) and outputs (in this case, a numeric value); next the operator issues a command to execute the function by specifying the input variable bindings by referring to a node in the knowledge graph (e.g., and specific column in a data set such as the training data set) and output destination in the knowledge graph (e.g., by specifying a node by unique identifier) and calling a library function which further invokes the API; next the knowledge graph server retrieves the specified input data (in this case the specific column in the training data set), returns the input data to the user's modeling environment, causes the modeling environment to execute the specified function, and stores the output in the specified location back in the specified location in the knowledge graph while simultaneously displaying the output to the operator. In this way the knowledge graph may monitor the execution of registered functions and capture intermediate inputs and outputs.

In other embodiments, a modeling system contains a model development environment which is augmented with a library of methods for registering functions with a knowledge graph such that the functions are automatically analyzed through introspection and code annotation such that the required inputs and expected outputs are recorded automatically in the knowledge graph. In other embodiments, modeling code is transmitted to the knowledge graph so that it execution may be easily reproduced at a later time. In other embodiments, a location, version or tag and path to a source file in a suitable source control system such as github, subversion, cvs, Microsoft® SourceSafe™ or the like are transmitted and stored. In this way, the modeling code may be incorporated into the knowledge graph for future debugging of model anomalies and to provide additional model documentation and reproducibility. In some embodiments the input variable analysis code, feature engineering code, model build history, including, model selection, training and validation data sets, model tuning parameters (hyperparameters), the tuning method, the validation results, statistical analysis, business and economic impact analysis, model comparison, model stability analysis, swap-set analysis, champion-challenger analysis and compliance analysis code and results are stored in the knowledge graph.

In some embodiments, the knowledge graph automates regeneration of a model and documentation based on an operator request to the modeling environment by first: accessing the modeling metadata, datasets, and code used at each stage of the modeling process; second: gathering the associated data sets and code and re-running the code on the data to generate intermediate results and documentation outputs at each stage of the modeling process based on metadata stored in the knowledge graph, and storing these intermediate results in the knowledge graph; third: retraining the models and automatically tuning and verifying them, producing complete model files and ensemble scoring functions, in addition to model evaluation and model risk management documentation; fourth: automatically generating and packaging model files, ensembling routines, API glue code and model monitoring artifacts including distributions, input and score models and thresholds; fifth: publishing model and model monitoring artifacts to an API to a model server communicatively coupled with the modeling environment via a computer network; finally: verifying the published model produces the expected results by accessing validation input rows and outputs based on metadata stored in the knowledge graph, issuing API requests with input rows to the published API, comparing model invocation outputs with the outputs retrieved from model validation stage based on metadata stored in the knowledge graph.

In this way, a credit risk model or other predictive model, without limitation, may be re-created automatically from the data and code stored in a knowledge graph, and associated model risk management documentation may be produced, enabling organizations to comply with the Model Risk Management framework described in OCC Bulletin 2011-12, Supervisory Guidance on Model Risk Management or other model governance processes, requiring such steps as:

model reproduction, testing and verification, documentation, and monitoring, without limitation.

Some embodiments disclosed herein provide automatic generation of model risk management documentation, such as, for example, data dictionary documentation, feature generation documentation, variable and feature safety documentation, variable and feature coverage documentation, modeling methods and optimization approach documentation, model stability analysis documentation, and fair lending documentation. In one embodiment, the system produces automated documentation by: first, allowing a user to select which documentation is to be generated by interacting with an operator device such as a model development and analysis environment which provides an operator interface such as R, python, or graphical tools; second, retrieving a template for model documentation (model documentation template, e.g., as shown in FIG. 10) comprised of natural language text and embedded references to variables, tabular and graphical formatting routines, natural language generation routines, and references to metadata stored in a knowledge graph; third, accessing variables and other metadata referenced in the documentation template from a structured data store such as an RDBMS, NOSQL, filesystem or other data storage system or device; fourth, accessing labeled relations between metadata elements as required to perform analysis referenced by variables contained in the documentation template; fifth, invoking data summarization, visualization and natural language generation routines, and storing the results in the knowledge graph; sixth, causing the data, summarizations, visualizations and other intermediate values stored in the knowledge graph to be substituted for variable names contained in the documentation template; and finally, generating HTML, PDF or other forms of documentation as selected by the end user via the operator device, and displaying the documentation on an operator device or causing the documentation to be transmitted to an end user via a computer network.

In some embodiments, the model risk management documentation is generated based on metadata stored in the knowledge graph. In one embodiment, the model risk management documentation is comprised of a feature selection process. A modeling system allows an operator to analyze input variables available for modeling by executing automated analysis functions via a von Neumann language or functional language such as R or Python. The analysis functions may be augmented with knowledge graph calls such that the inputs, analysis methods (e.g., Kolmogorov-Smirnov test, median, quantiles, PSI score, autoencoder distribution analysis) and outputs (e.g., variable stability metric, coverage metric, and other descriptive statistics, without limitation) are automatically transmitted via API to a knowledge graph for storage.

In some embodiments, the knowledge graph contains datasets, experiments, functions, function invocation history, and other metadata such as: user information, dates and times, statistics, names, and code snippets. In one embodiment the metadata includes tags or labels which allow the operator to refer to a specific invocation. In one embodiment the knowledge graph server is comprised of a web server and a relational database such as mysql, consisting of several tables as described above. In another embodiment the knowledge graph stores locations of datasets in an associated data store such as HDFS, GlusterFS, NFS, Oracle RDBMS, mySQL, Microsoft SQL Server, IBM DB2, Amazon S3, or other data store, without limitation.

Figure 1:
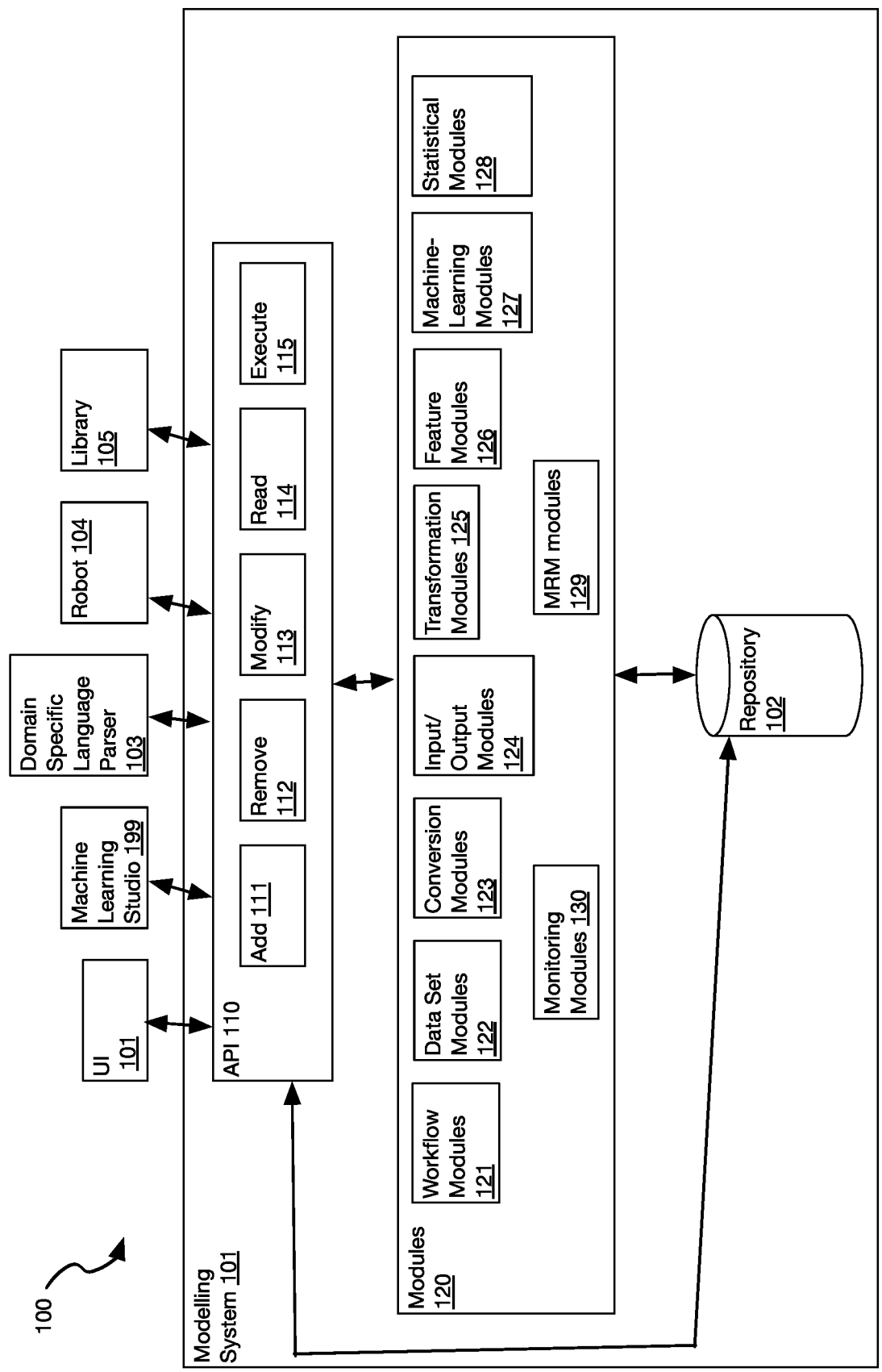
FIG. 1 is a schematic representation of a system, according to embodiments.

In some embodiments, the foregoing features are provided by a modeling system (e.g., 101 of FIG. 1). In some embodiments the modeling system is an on-premises modeling system. In some embodiments, the modeling system is a cloud-based modeling system. In some embodiments, the modeling system is comprised of model development and model execution systems. In some embodiments, the model development system provides a graphical user interface which allows an operator to access a programming environment and tools such as R or python, and contains libraries and tools which allow the operator to prepare, build, explain, verify, publish, and monitor machine learning models. In some embodiments, the model execution system provides tools and services that allow machine learning models to be published, verified, executed and monitored. In some embodiments, the modeling system includes tools that utilize a semantic layer that stores and provides data about variables, features, models and the modeling process. In some embodiments, the semantic layer is a knowledge graph stored in a repository (e.g., 102 of FIG. 1). In some embodiments, the repository (e.g., 102) is a storage system. In some embodiments, the repository (e.g., 102) is included in a storage medium (e.g., 305 shown in FIG. 3).

In some embodiments, the modeling system includes an application programming interface (API) (e.g., 110 of FIG. 1) that provides access to modeling tool modules (e.g., 120 of FIG. 1) and access to a modeling tool repository (e.g., that stores a Knowledge Graph) that stores data about variables, features, models, modeling processes, and analysis.

In some embodiments, the repository (e.g., 102 of FIG. 1) stores facts about variables and features. In some embodiments, the repository stores information that indicates where a variable came from (e.g., which database, which query, when retrieved), which variables contribute to a feature (e.g., average of which two variables, maximum within which column), how a feature was calculated (in human-readable language, e.g., English, and in computer-executable code), descriptive statistics, visualizations, and summaries, including: histograms, distributions, analyses, principal components, anomalies, missing data, time-series, comparisons, a feature's ideal value, and protected class proxies (e.g., variables, features, or combinations of variables and features that can identify a protected class).

In some embodiments, the repository stores facts about a model (e.g., a model used by a machine-learning module 127 of FIG. 1), including, without limitation: the training and validation data sets, the modeling method/machine learning algorithm used, the model tuning parameters, model scores, model evaluation and analysis. In some embodiments, the repository stores information that indicates lists of submodels in an ensembled model, model type and hyperparameters of a model or submodel, scoring functions of a model or submodel, feature contributions of a model or submodel. In some embodiments the feature contributions are linked to the feature descriptions and descriptive statistics and metadata, as described above. In some embodiments, the repository stores information that indicates for an ensemble model an ensembling method, submodel, weights of submodels, and scoring functions for submodels and the scoring function for the ensemble. In other embodiments the repository stores information about the feature contributions of the ensemble.

In some embodiments, the repository stores information about the distribution of input variables, features, model scores, and score explanations as derived from analysis of training, test and hold-out data and the running of the model on such data sets. In some embodiments score explanations are computed using a decomposition such as a method described in U.S. Provisional Patent Application No.

62/641,176, filed 9 Mar. 2018, entitled "SYSTEMS AND METHODS FOR PROVIDING MACHINE LEARNING MODEL EXPLAINABILITY INFORMATION BY USING DECOMPOSITION", by Douglas C. Merrill et al. In some embodiments score explanations are computed using a decomposition such as a method described in U.S. Provisional Patent Application No. 62/806,603 ("SYSTEMS AND METHODS FOR DECOMPOSITION OF DIFFERENTIABLE AND NON-DIFFERENTIABLE MODELS"), filed 15 Feb. 2019. In some embodiments score explanations are computed using a method described in U.S. Provisional Patent Application No. U.S. Application No. 62/820,147 ("SYSTEMS AND METHODS FOR MODEL FAIRNESS"), filed 18 Mar. 2019. In other embodiments, the repository stores information about the distribution of input variables, features, model scores and score explanations as derived from operating the model in production. In some embodiments tools are provided that automatically compare the distribution of input variables, features, model scores and score explanations as derived from operating the model in production, with the same distributions derived from analysis of training, test and hold-out data and the running of the model on each of these data sets while the model was still in development. In some embodiments the comparing step produces a numeric score representing how close the development and production distributions match. In some embodiments the comparing step is based on the population stability index, given by the following equation:

$$PSI = \sum \left((\text{Actual \%} - \text{Expected \%}) \times \left(\ln\left(\frac{\text{Actual \%}}{\text{Expected \%}}\right)\right)\right)$$

In other embodiments the comparing step is based on the use of autoencoders. In one embodiment, an autoencoder is trained based on the model's training data. The MSE (mean squared error) for the autoencoder on the validation data is computed. The same encoder is used on input data observed in production. The input data will be reconstructed by the autoencoder, and for each instance, the mean squared error (MSE) between actual value and reconstruction is calculated. If the MSE exceeds a threshold, for example, a threshold based on the validation MSE computed during model construction, an alert may be raised.

In some embodiments, the comparing step is used to produce a numeric score representing the similarity of the production data to the data observed in training. In other embodiments the comparing step is communicatively coupled with an alerting system via a computer network. In one embodiment, the alerting system sends emails, SMS messages, and other forms of alerts to operators based on the numeric score, in order to alert the operator that the model may be encountering data or behaving in ways that are unsafe. In one embodiment, a dashboard of anomalous model inputs and scores is presented to an operator so they can inspect the outliers and take action to retrain the model or ignore the alerts and add the anomalous data to the baseline data for the modeling system. In one embodiment, each addition to baseline data is tracked in a knowledge graph so that the history of modifications may be preserved and rolled back, should the operator choose to undo past modifications. In this way an intelligent monitoring system may be constructed that learns from human judgment as alerts are cleared or actioned.

In some embodiments, at least one modeling tool module (e.g., of 120) is a modeling node that specifies a transformation, defines input data used by the transformation, and output data generated by applying the transformation to the input data. In this way, the history of transformations used to generate intermediate data may be tracked and organized.

In some embodiments, the modeling system API (e.g., 110) provides an interface for programmatically adding modeling tool modules (modeling nodes) (e.g., 120), removing modeling tool modules, modifying modeling tool modules, executing modeling tool modules, getting information about a modeling tool module, reading data from the modeling repository, and writing data to the modeling tool repository.

In some embodiments, when executed, each modeling tool module 120 is constructed to read data from the modeling system repository (e.g., 102) and write data to the modeling system repository. In some embodiments, each modeling tool module (e.g., a module of 120 of FIG. 1) is constructed to write meta-data to the modeling system repository that can be used to generate model risk management documentation. In some embodiments, each modeling tool module (e.g., a module of 120 of FIG. 1) is constructed to write meta-data to a knowledge graph of the modeling system repository that can be used to generate model risk management documentation.

By virtue of each modeling tool module writing meta-data to the modeling system repository that can be used to generate model risk management documentation during module execution, model risk management documentation can be automatically generated by using the modeling system API to prepare, build, explain, and monitor a machine-learning model (e.g., a model of a machine-learning module 127). In some embodiments, the modeling system API can be accessed and used a user interface (e.g., 101), a robot (e.g., 104), a domain specific language parser (e.g., 103), a programming library (e.g., a Python library, an R library, and the like) (e.g., 105), a virtual machine (e.g., a Java virtual machine, a Web Assembly virtual machine), a programming language interpreter, a Microsoft Azure machine-learning system, and the like.

In some embodiments, modeling tool modules include: modeling workflow modules (e.g., 121), data set modules (e.g., 122), data format conversion modules (e.g., 123), data input modules (e.g., 124), data output module (e.g., 124), data transformation modules (e.g., 125), feature selection modules (e.g., 126), machine learning modules (e.g., 127), statistical function modules (e.g., 128), and MRM (Model Risk Management) modules (e.g., 129).

In some embodiments, input modules (e.g., 124) include machine executable instructions that, when executed by a processing unit (e.g., 399), control the modeling system to access input data sets form an input data source. In some embodiments, output modules (e.g., 124) include machine executable instructions that, when executed by a processing unit (e.g., 399), control the modeling system to provide output data sets to one of a system and a module that is constructed to consume an output of a workflow associated with the output module.

In some embodiments, data transformation modules (e.g., 125) include filter modules, sample modules, and split modules.

In some embodiments, machine learning modules (e.g., 127) include model initialization modules (e.g., for one or more machine learning algorithms), model training modules, model scoring modules, and model evaluation modules. In some embodiments, model evaluation modules include model comparison and champion/challenger analysis modules. In some embodiments, model evaluation modules include feature importance and partial dependence plots modules. In some embodiments, model evaluation modules include model stability analysis modules. In some embodiments, model evaluation modules include reason code generation modules. In some embodiments, model evaluation modules include segment comparisons and analysis modules. In some embodiments, model evaluation modules include disparate impact evaluation modules. In some embodiments, model evaluation modules include adverse action modules.

In some embodiments, feature engineering modules (e.g., 126) are constructed to write descriptions of generated features to a knowledge graph of the modeling tool repository (e.g., as a knowledge graph node). In some embodiments, a disparate impact evaluation module is constructed to record in the knowledge graph of the modeling tool repository whether a variable is safe from a fair lending perspective.

In some embodiments, the knowledge graph of the modeling tool repository is constructed to point to code and data tables.

In some embodiments, the API 110 of the modeling system 101 is used to generate a modeling workflow (e.g., workflow 401 of FIG. 4) by configuring interconnections between selected modeling tool modules, and the modeling system stores configuration (and related metadata) for each configured modeling workflow in the knowledge graph modeling tool repository. In some embodiments, for each workflow and for each module of a workflow, the knowledge graph stores properties and module execution metadata. In some embodiments, module execution metadata includes execution start time, execution end time, execution elapsed time, execution status code, and execution details. In some embodiments, module properties stored by the knowledge graph include user-specified properties, such as, for example, configuration properties, textual descriptions, human-readable explanation text, charts, graphs, partial dependence plots, heat maps, visualizations, and data tables, and the like.

Figure 4:
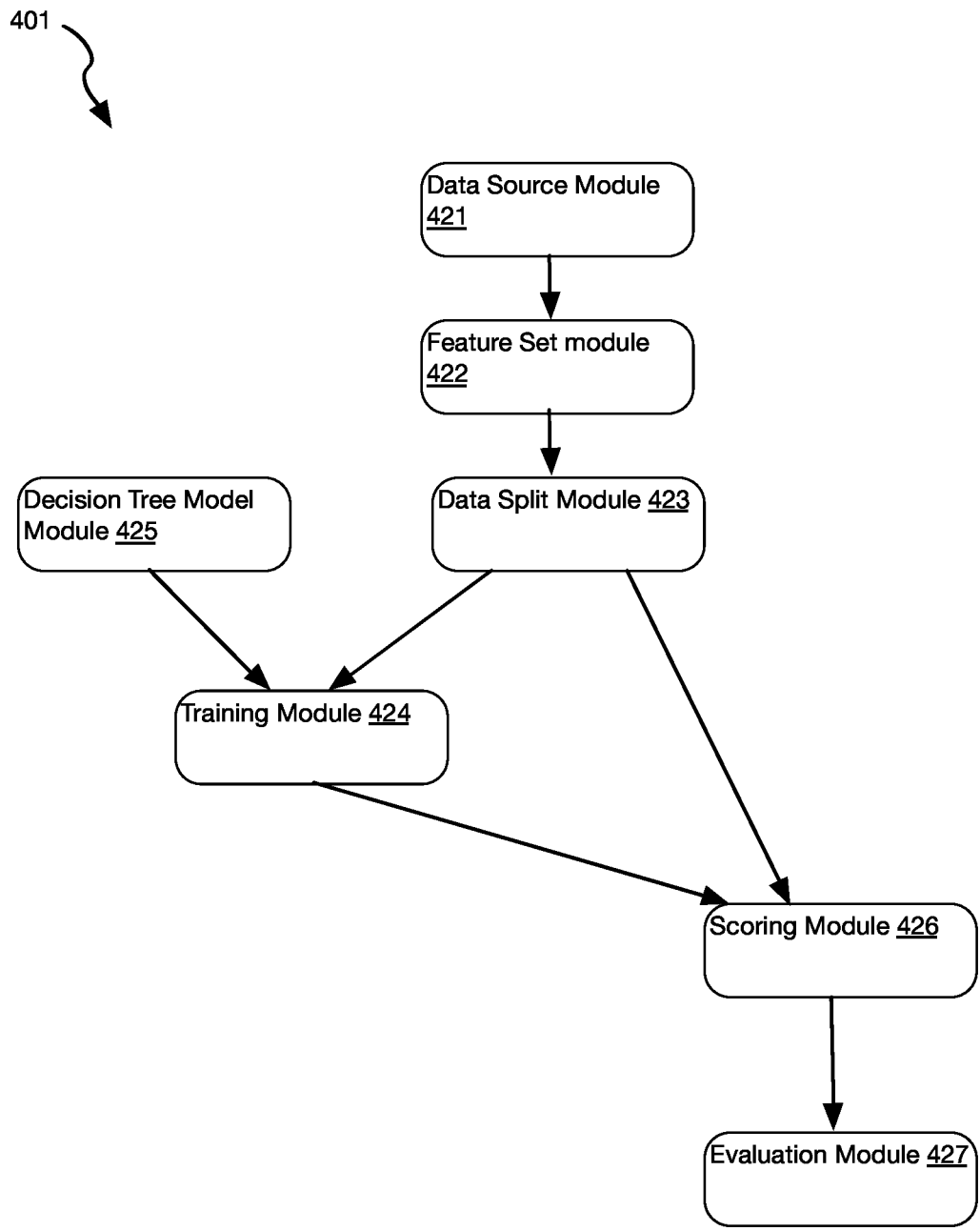
FIG. 4 is a diagram depicting a modeling workflow, according to embodiments.

FIG. 4 is a schematic diagram depicting an exemplary modeling workflow. In a case where the modeling system receives API requests to generate the modeling workflow 401 of FIG. 4, the knowledge graph stores configuration (and related metadata) of the modeling workflow 401 in at least one knowledge graph node. As shown in FIG. 4, the modeling workflow 401 includes a data source module 421 whose output is coupled to an input of a feature selection module 422 whose output is coupled to a data split module 423, a training module 424 whose first input is coupled to an output of the data split module and whose second input is coupled to an output of a decision tree model module 425, a scoring module 426 whose first input is coupled to an output of the training module 424 and whose second input is coupled to a second output of the data split module 423, and an evaluation module 427 whose input is coupled to an output of the scoring module 426.

In some embodiments, modules are coupled to each other via the API 110 of the system 101. In some embodiments, modules are coupled to each other via an API that is internal to the modeling system 101.

In some embodiments, each modeling workflow is represented by a modeling tool module (e.g., a module of workflow modules 121) that is accessible via the API 110 of the modeling system.

In some embodiments, the knowledge graph of the repository 102 is constructed to store references (or pointers) to code and data tables used by a module included in the modules 120. For example, the knowledge graph includes knowledge graph nodes that can store references to scoring functions, feature engineering functions, pointers to training data, pointers to validation data for a module (e.g., a workflow module 121), and this stored information can be used for generating artifacts like PDPs that can be included in MRM (Model Risk Management) documentation.

In some embodiments, the knowledge graph of the repository 102 is constructed to store the following for a modeling workflow: variable provenance, feature provenance, sub-models selection, ensembling methods, parameter tuning history, feature contributions, disparate impact analysis, stability over time, feature contributions, economic impact analysis, swap-set analysis, blind spot analysis, fair lending analysis, and measured model performance during development.

In some embodiments, the modules 120 of FIG. 1 include: a distribution shift detector module, an automated tuning module, a model performance evaluation module, an automated analysis of variables module, an automated analysis of features module, an automated analysis of impacts module, an automated analysis of stability module, a blindspot analysis module, a fair lending analysis module, and an automated analysis of model behavior on new data sets module.

In some embodiments, MRM modules 129 includes a data dictionary stability analysis module, a modeling method and optimization module, a pre-launch model safety and compliance module, a model safety and compliance in production module.

Figure 6:
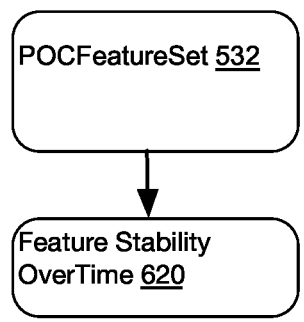
FIG. 6 is a diagram depicting a knowledge graph node of a Model Risk Management module, according to embodiments.

In some embodiments, MRM modules include a feature stability over time module (e.g., a module corresponding to knowledge graph node 620 of FIG. 6).

Figure 8:
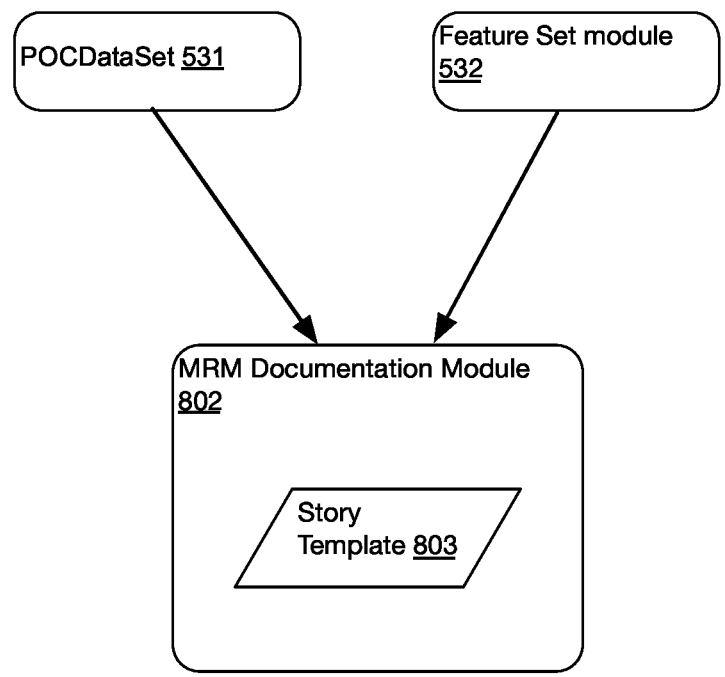
FIG. 8 is a diagram depicting a knowledge graph node of a Model Risk Management module, according to embodiments.

In some embodiments, MRM modules include a MRM documentation module (e.g., a module corresponding to the knowledge graph node 802 of FIG. 8).

In some embodiments, the "pre-launch model safety and compliance" module includes machine-readable program instructions (e.g., stored in the storage medium 305 shown in FIG. 3) that, when executed by a processing unit (e.g., 399 shown in FIG. 3), cause the modeling system (e.g., 101) to determine which input variables are safe to use for modeling. In some embodiments, the "model safety and compliance in production" module includes machine-readable program instructions (e.g., stored in the storage medium 305 shown in FIG. 3) that, when executed by a processing unit (e.g., 399 shown in FIG. 3), cause the modeling system (e.g., 101) to determine which input variables are safe to use for modeling.

In some embodiments, modifying a data set module 122 via the API 110 includes at least one of adding a variable and removing a variable, and adding a natural language description for a variable.

In some embodiments, modifying a feature set module 126 via the API 110 includes at least one of adding a feature and removing a feature, and adding a natural language description for a feature. In some embodiments, the API includes documenting the input data used to generate a feature.

In some embodiments, the system 101 includes a module for automated analysis of stability over time. In some embodiments, the system 101 includes a module for rank ordering of variables by stability.

In some embodiments, the system 101 includes an MRM module for automated generation of a data dictionary that includes a table and an associated narrative. In some embodiments, the system 101 includes an MRM module for automated generation of a model stability over time chart and associated narrative. In some embodiments the MRM report is generated using templates that include a static text and graphics and a dynamic text and graphics, wherein the dynamic text and graphics includes references to stored data representing numeric values, charts, data tables and the like, related to the analysis step being described. In some embodiments the MRM report is generated by using a templating language such as: ASP.NET, PHP, R Markdown, LaTeX, Smarty, Elixir, Mustache, Jade, Kid, Django, Twig, web2py, or any templating language without limitation.

In some embodiments, the system 101 includes a module for automated distribution analysis. In some embodiments, the system 101 includes a module for automated MRM documentation. In some embodiments, the system 101 includes a module for automated model publishing. In some embodiments, the system 101 includes a module for automated adverse action mapping and verification. In some embodiments, the system 101 includes a module for automated model monitoring.

Knowledge Graph

In some embodiments, the repository 102 stores a knowledge graph which contains information about modules (modeling nodes), attributes, and labeled edges describing model variables, the model, a machine-readable representation of the model's computational graph, modeling methods used, training and test data, attributes of training and test data including date (and time) ranges and provenance, feature engineering methods, test descriptions including results, hyperparameters, AUC charts, hold out sets, swapset analysis, economic impact analysis, approval rate analysis, loss projection analysis, ensembling method, data source and provenance, data ranges, a machine-readable description of feature engineering methods, partial dependence plots, or decompositions. In some embodiments model metadata includes a mapping between decompositions, feature contributions and adverse action reason codes. In some embodiments the adverse action mapping is a computable function based on a decomposition of a model score into input variable contributions. In some embodiments the decomposition is based on a Shapley value or an integrated gradient or suitable decomposition method that is implementation invariant and that accurately explains the model score. In some embodiments model metadata is stored on a filesystem in a suitable format such as JSON, YAML or feather, python serialized object, CSV, or in database.

In some embodiments modeling tools (e.g., modules 120) are provided to an operator (e.g., via the API 110) to perform decompositions. In some embodiments modeling tools (e.g., modules 120) collect metadata from the operator (e.g., via the API 110) that is associated with a decomposition. In some embodiments, the decomposition is comprised of a feature name and a numeric value. In some embodiments the sum of the values equals the model's score for a given applicant. In some embodiments the decomposition is computed with respect to a baseline population. In some embodiments, the metadata collected from the operator includes the decomposition, the model or ensemble and metadata, including feature descriptions, source variables and provenance, feature distributions over time, training data, statistics, symbols, natural language descriptions and templates, and other metadata, without limitation.

Figure 9:
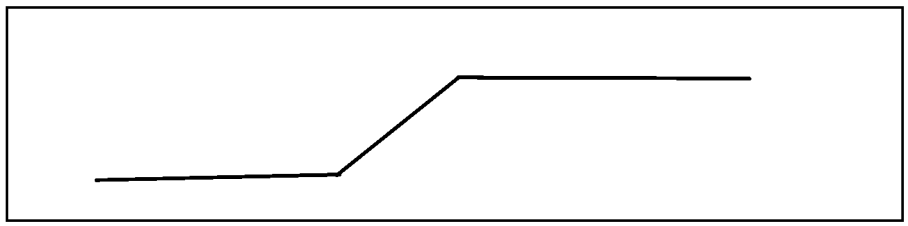
FIG. 9 is a depiction of a Model Risk Management document, according to embodiments.

In some embodiments, model metadata based on decompositions is used to automatically generate model risk management (MRM) and other compliance artifacts and documentation (e.g., the MRM document of FIG. 9). In some embodiments this documentation allows companies to comply with OCC Bulletin 2011-12, Supervisory Guidance on Model Risk Management. In other embodiments this documentation allows companies to demonstrate compliance with the Equal Credit Opportunity act of 1975 (12 CFR 202 et seq), incorporated herein by reference. In some embodiments, the model risk management documentation includes decompositions of model scores with respect to populations over time, and at decision points in the modeling process. In other embodiments, the compliance documentation includes fair lending analysis, including: disparate treatment analysis, disparate impact analysis and a less discriminatory alternative search process. In one embodiment, the disparate impact analysis includes approval rates among population segments such as protected classes and a baseline, determination of which features contribute to the approval rate disparity, and an analysis of each feature's economic impact. In one embodiment, the disparate impact analysis includes the disposition of a variable's suitability for inclusion in the model (included or suppressed) and the reason for the disposition (including a business justification, quantification of harm, and natural language representing the reasoning behind the disposition, and attribution of the judgment to an identified responsible person). In some embodiments, the fair lending analysis includes a less discriminatory alternative search process, including a leave one out analysis, which is comprised of examining the approval rate difference and predictive performance and economic performance (in a currency, such as USD) of a model disaggregated by protected class membership status. In some embodiments the leave one out analysis is comprised of evaluating these model outputs when each variable is not provided to the model, and other methods, without limitation. In some embodiments, the fair lending analysis uses a fairness metric such as the ratio of approval rates between the unprotected and each protected class. In some embodiments, the fair lending analysis includes a narrative description of the analysis method, the approval rate differences and economic differences with and without each variable in the model. In some embodiments the list of variables is retrieved from a metadata store such as a knowledge graph as described herein. In other embodiments machine learning model risk management documentation includes decompositions of model scores under missing data conditions. In other embodiments the model documentation includes decomposition of model scores across a range of input values for each variable in the model.

In some embodiments model metadata based on decompositions is used to automatically generate model risk management documentation in relation to the ongoing health of models operating in production. In some embodiments, a monitoring method includes first computing the distribution of decompositions of a model's score in batch, live testing, or production within a given timeframe in the past, and comparing the past distributions with the distribution of decompositions of a model's score with a more recent timeframe. In some embodiments the comparing step includes computing a PSI score, Kolmogorov-Smirnov test, or other suitable statistic. In other embodiments the comparing step includes computing influence functions.

In some embodiments, decompositions and model metadata are used in modeling tools (e.g., modules 120) that provide a workflow to prepare adverse action mappings and to generate adverse action notices based on model scores, in batch and at decision-time. In some embodiments the adverse action mapping is comprised of a first relation between a model feature, sign, and a reason code, and a second relation between a reason code and a natural language reason. In other embodiments, the adverse action mapping is a computable function of the decomposition and a set of tunable parameters. In some embodiments the adverse action mapping is computed based on a gradient. In some embodiments the gradient is computed based on a partial dependence plot. In some embodiments the partial dependence plots are stored and retrieved from a knowledge graph as described herein.

2. Systems

FIG. 1 is a schematic representation of a system, according to embodiments. As shown in FIG. 1, the system 100 includes a modeling system 101 communicatively coupled to at least one modeling system client. Modeling system clients shown in FIG. 1 include a User Interface 101, a machine learning studio 199, a domain-specific language parser 103, a robot 104, a code library 105 (e.g., a Python library, an R library, and the like). The modeling system 101 includes an API 110. In some embodiments the API is a public API. In some embodiments, the API is a private API. In some embodiments, the API is a RESTful API. In some embodiments, the API is an HTTP-based API. In some embodiments, the API is a Web Service API.

In some embodiments, the API 110 includes API resources for adding modeling tool modules (e.g., resource 111), removing modeling tool modules (e.g., resource 112), modifying modeling tool modules (e.g., resource 113), accessing information (e.g., configuration, properties, execution metadata) about modeling tool modules (e.g., resource 114), and executing modeling tool modules (e.g., resource 115). In some embodiments, each API resource is a method exposed by an object. In some embodiments, each API resource is a request handler module that is constructed to process requests directed to a URI of the API resource, and provide a response to each request. In some embodiments, each URI is accessible via an HTTP interface, and each resource is accessed by providing HTTP GET (and/or POST requests) that specify the URI of a particular resource. In some embodiments, each URI is accessible via a RESTful interface.

In some embodiments, the modeling system includes a plurality of modeling tool modules 120 that are accessible via the API 110. In some embodiments, each API resource is constructed to process requests that specify a particular modeling tool module (e.g., a module of modules 120) by accessing the specified API. For example, the execute API resource is constructed to process module execution API requests that specify a module to be executed by executing the module (via an API request, a remote procedure call, a local procedure call, and the like). In some embodiments, the add API resource is constructed to process module generation API requests that specify properties of a module to be generated by storing module configuration (and related metadata) for the new module in the repository 102 (e.g., as one or more nodes of knowledge graph), and adding the new module to a list of models included in modules 120. In some embodiments, the add API resource is constructed to process module generation API requests that specify properties of a new workflow module to be generated by storing module configuration (and related metadata) for the new module in the repository 102 (e.g., as one or more nodes of knowledge graph), and adding the new workflow module to a list of models included in modules 120, wherein the configuration for the workflow module specifies the modules used by the new workflow module, and the interconnections between each module. For example, the add API resource is constructed to process a new workflow module generation API request to generate the workflow module 401 of FIG. 4, wherein the configuration for the workflow module specifies the modules 421-427 and the interconnections between the modules as shown in FIG. 4. In some embodiments, each module of a new workflow module API request is already generated and configured. In some embodiments, a new workflow module is generated by first generating each module that is to be used by the new workflow module (if the module does not already exist) by using the API resource 111, and generating the new workflow module after all sub-modules have been generated and configured. In some embodiments, configuration for each module is stored and accessible for use by other modules. In other words, models generated for a first workflow module can be stored and re-used for a second workflow module. In some embodiments, different entities (or account holders) can share at least one module, such that in a multi-tenant modeling system 101, at least some modules generated by a first account holder can be used across all account holders of the modeling system 101.

In some embodiments, modules 120 includes one or more workflow module 121, data set module 122, conversion module 123, input/output module 124, transformation module 125, feature module 126, machine learning module 127, statistical module 128, and MRM (Model Risk Management) module 129. In some embodiments, at least one module of 120 is generated by the system 101 (e.g., a core module). In some embodiments, at least one module of 120 is generated by a user of the system 101 (e.g., a custom module).

In some embodiments, the system 101 includes a modeling tool module repository 102 that includes at least one knowledge graph. In some embodiments, the system 101 includes a modeling tool module repository 102 that includes at least one knowledge graph for each modeling workflow module. In some embodiments, each knowledge graph is a data structure that identifies graph nodes and graph edges that connect graph nodes.

Data Modules

In some embodiments, the knowledge graph of the repository 102 stores the following information for each data set module (e.g., 122 shown in FIG. 1): start date, end date, Provenance, Training Range, Validation Range, and Variables of a data set represented by the data set module. In some embodiments, for each variable of a data set module, the knowledge graph of the repository 102 stores the following information: variable name, data type, provenance, Minimum value, Maximum value, and Median value of the data set represented by the data set module. In some embodiments, the knowledge graph of the repository 102 stores the same information for data set modules and data source modules.

Feature Modules

In some embodiments, the knowledge graph of the repository 102 stores the following information for each feature set module (e.g., 126 shown in FIG. 1): start date, end date, module that generated the features of the feature set, data set, range of the data set, and features of the feature set represented by the feature set module. In some embodiments, for each feature of a feature set module, the knowledge graph stores the following information: feature name, data type, provenance, Minimum value, Maximum value, and Median value, and method of generation of the feature. In some embodiments, a provenance of a feature can specify more than one variable of the data set, and the method specifies a method of generation of the feature from each variable of the feature as specified in the provenance. In some embodiments, for each feature of a feature set module, the knowledge graph stores a PSI for at least one feature of the feature set. In some embodiments, for each feature of a feature set module, the knowledge graph stores a median vector for at least one feature of the feature set.

Methods

Figure 2:
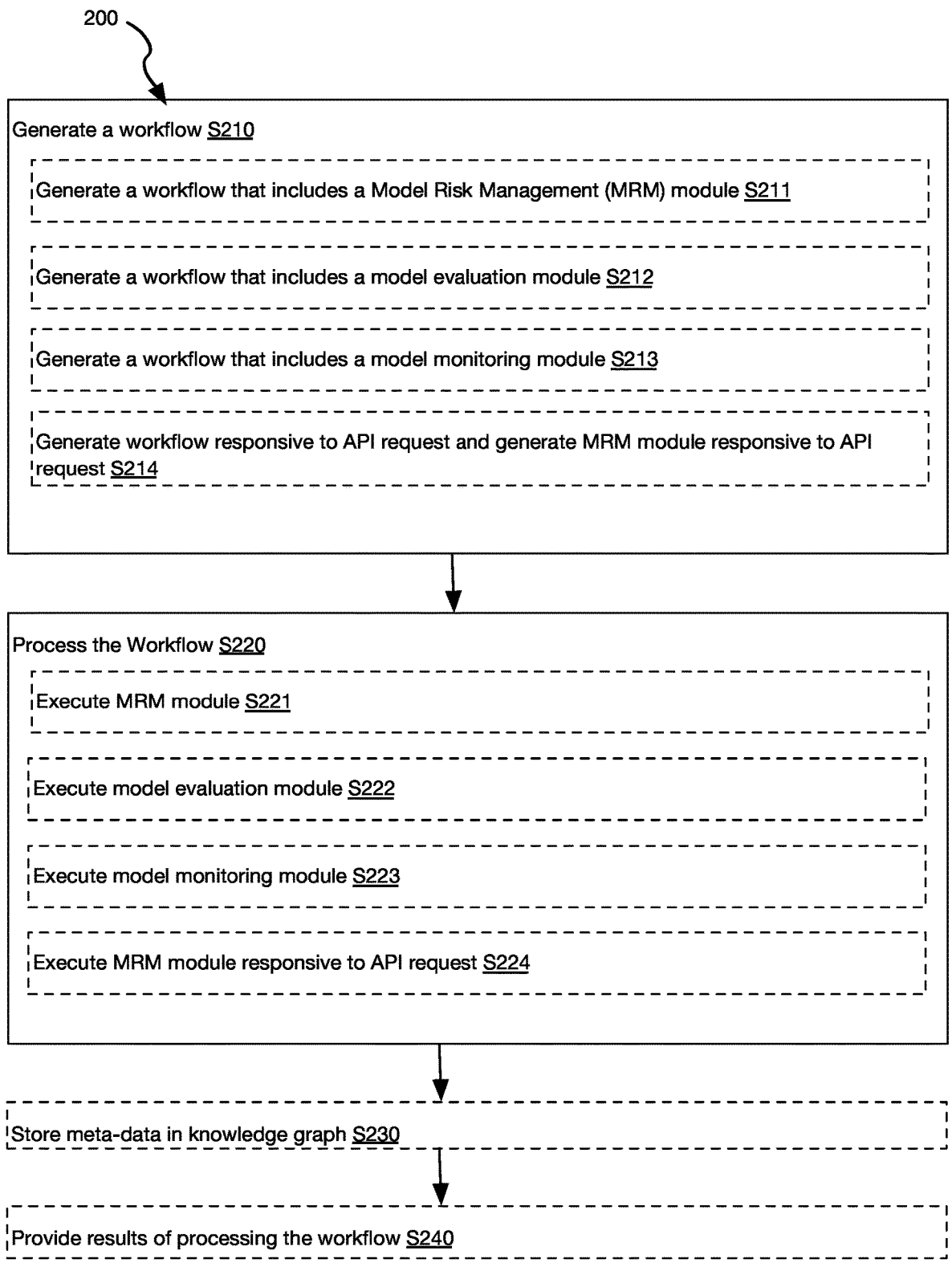
FIG. 2 is a representation of a method, according to embodiments.

FIG. 2 is a representation of a method 200, according to embodiments. In some embodiments, the method 200 includes: generating a workflow (e.g., 121 shown in FIG. 1, 401 shown in FIG. 4, 501 shown in FIG. 5A) (S210); and processing the workflow (S220). In some embodiments, the workflow includes one or more modules (e.g., 122-130 shown in FIG. 1). In some embodiments, processing the workflow includes executing the workflow. In some embodiments, executing the workflow includes executing at least one module of the workflow. In some embodiments, the method 200 includes storing meta-data for the workflow in a knowledge graph (e.g., 502 shown in FIG. 5B) (S230). In some embodiments, the method 200 includes: providing results of the processing of the workflow to an external system (e.g., one of 101-105 of FIG. 1) responsive to processing of the workflow (S240). In some embodiments, results of the processing of the workflow are provided to an external system (e.g., one of 101, 103, 104, 105, 199 of FIG. 1) via an API 110 of a modeling system. In some embodiments, the method 200 is performed by the modeling system 101. In some embodiments, the method 200 is performed by a multi-tenant modeling system.

In some embodiments, the method is performed by a modeling system that includes an API (e.g., 110 shown in FIG. 1), a plurality of modules, including a model risk management (MRM) module (e.g., 129), and a repository (e.g., 102). In some embodiments, the method is performed by a modeling system that includes an API (e.g., 110 shown in FIG. 1), a plurality of modules, including an evaluation module (e.g., 127), and a repository (e.g., 102). In some embodiments, the method is performed by a modeling system that includes an API (e.g., 110 shown in FIG. 1), a plurality of modules, including a model monitoring module (e.g., 130), and a repository (e.g., 102).

In some embodiments, S210 includes generating a workflow that includes a model risk management (MRM) module (e.g., 129 shown in FIG. 1) (S211), and S220 includes executing the MRM module to generate MRM information (S221). In some embodiments, MRM information includes feature stability information for at least one feature generated from input data processed during processing of the workflow. In some embodiments, MRM information includes feature safety information for at least one feature generated from input data processed during processing of the workflow. In some embodiments, S211 includes: generating a workflow data structure (e.g., 121 shown in FIG. 1) for the workflow based on information received via the API, the workflow data structure identifying the MRM module. In some embodiments, S211 includes: storing a knowledge graph data structure for the workflow in the repository (storage system), and S221 includes: accessing input data from at least one storage device, using at least one processing unit (e.g., 399 shown in FIG. 3) to process the input data in accordance with the workflow data structure to generate meta-data, including the MRM information, and storing the meta-data (including the MRM information) in the knowledge graph data structure.

In some embodiments, S210 includes generating a workflow that includes a model evaluation module (e.g., 127 shown in FIG. 1) (S212), and S220 includes executing the model evaluation module to generate model evaluation information (S222). In some embodiments, the model evaluation information is generated from model scores (results) generated during processing of the workflow. In some embodiments, model evaluation information includes model score explanation information for at least one model score for at least one model score generated during processing of the workflow. In some embodiments, the model score explanation information is a human-readable textual explanation generated for the model score. Methods for generating model score explanation information are described in U.S. application Ser. No. 15/970,626 ("SYSTEMS AND METHODS FOR PROVIDING MACHINE LEARNING MODEL EXPLAINABILITY INFORMATION"), filed 3 May 2018, Ser. No. 16/297,099 ("SYSTEMS AND METHODS FOR PROVIDING MACHINE LEARNING MODEL EVALUATION BY USING DECOMPOSITION"), filed 8 Mar. 2019, 62/682,714 ("SYSTEMS AND METHODS FOR DECOMPOSITION OF TREE AND DIFFERENTIABLE MODELS"), filed 8 Jun. 2018, and 62/806,603 ("SYSTEMS AND METHODS FOR DECOMPOSITION OF DIFFERENTIABLE AND NON-DIFFERENTIABLE MODELS"), filed 15 Feb. 2019, the contents of each of which are incorporated by reference herein. In some embodiments, model evaluation information includes model fairness information for at least one model of the workflow. In some embodiments, the model fairness information includes disparate impact information, and methods for generating disparate impact information are described in U.S. application Ser. No. 16/052,293 ("SYSTEMS AND METHODS FOR PROVIDING MACHINE LEARNING MODEL DISPARATE IMPACT INFORMATION"), filed 1 Aug. 2018, Ser. No. 16/297,099 ("SYSTEMS AND METHODS FOR PROVIDING MACHINE LEARNING MODEL EVALUATION BY USING DECOMPOSITION"), filed 8 Mar. 2019, 62/682,714 ("SYSTEMS AND METHODS FOR DECOMPOSITION OF TREE AND DIFFERENTIABLE MODELS"), filed 8 Jun. 2018, and 62/806,603 ("SYSTEMS AND METHODS FOR DECOMPOSITION OF DIFFERENTIABLE AND NON-DIFFERENTIABLE MODELS"), filed 15 Feb. 2019, the contents of each of which are incorporated by reference herein. Methods for generating model fairness information are described in U.S. Application No. 62/820,147 ("SYSTEMS AND METHODS FOR MODEL FAIRNESS"), filed 18 Mar. 2019, the contents of which is incorporated by reference herein. In some embodiments, model evaluation information includes a model score decomposition for at least one model score generated during processing of the workflow. In some embodiments, generation of a model score decomposition is described in U.S. application Ser. No. 16/297,099 ("SYSTEMS AND METHODS FOR PROVIDING MACHINE LEARNING MODEL EVALUATION BY USING DECOMPOSITION"), filed 8 Mar. 2019, 62/682,714 ("SYSTEMS AND METHODS FOR DECOMPOSITION OF TREE AND DIFFERENTIABLE MODELS"), filed 8 Jun. 2018, and 62/806,603 ("SYSTEMS AND METHODS FOR DECOMPOSITION OF DIFFERENTIABLE AND NON-DIFFERENTIABLE MODELS"), filed 15 Feb. 2019, the contents of each of which are incorporated by reference herein. In some embodiments, S212 includes: generating a workflow data structure (e.g., 121 shown in FIG. 1) for the workflow based on information received via the API, the workflow data structure identifying the model evaluation module and at least one model scoring module (e.g., 127). In some embodiments, S212 includes: storing a knowledge graph data structure for the workflow in the repository (storage system), and S220 includes: accessing input data from at least one storage device, using at least one processing unit (e.g., 399 shown in FIG. 3) to process the input data in accordance with the workflow data structure to generate meta-data, including the model evaluation information, and storing the meta-data (including the model evaluation information) in the knowledge graph data structure. In some embodiments, S222 includes: generating at least one model score in accordance with a definition for the model scoring module (the definition being included in the knowledge graph), and generating the model evaluation information based on at least one generated model score in accordance with the definition of the model evaluation module.

In some embodiments, S210 includes generating a workflow that includes a model monitoring module (e.g., 130 shown in FIG. 1) (S213), and S220 includes executing the model monitoring module to generate model monitoring information. In some embodiments, model monitoring information identifies an input data distribution for at least one feature of input data processed during processing of the workflow (S223). In some embodiments, model monitoring information identifies an output data (score) distribution for at least one feature of input data processed during processing of the workflow. In some embodiments, model monitoring information identifies at least one unexpected value for at least one feature of input data processed during processing of the workflow. In some embodiments, model monitoring information identifies at least one unexpected value for at least one score generated processed during processing of the workflow. In some embodiments, S213 includes: generating a workflow data structure (e.g., 121 shown in FIG. 1) for the workflow based on information received via the API, the workflow data structure identifying the model monitoring module and at least one model scoring module (e.g., 127). In some embodiments, S213 includes: storing a knowledge graph data structure for the workflow in the repository (storage system), and S223 includes: accessing input data from at least one storage device, using at least one processing unit (e.g., 399 shown in FIG. 3) to process the input data in accordance with the workflow data structure to generate meta-data, including the model monitoring information, and storing the meta-data (including the model monitoring information) in the knowledge graph data structure. In some embodiments, S223 includes: generating at least one model score in accordance with a definition for the model scoring module (the definition being included in the knowledge graph), and generating the model monitoring information based on at least one of input data for a generated model score and a generated model score, in accordance with the definition for the model monitoring module.

In some embodiments, S210 includes: the modeling system generating a first modeling workflow (e.g., FIG. 4) responsive to at least one workflow generation API request, and the modeling system generating a first model risk management module (e.g., corresponding to the knowledge graph node 820 shown in FIG. 8) for the first modeling workflow based on at least one MRM generation API request (S214). In some embodiments, S220 includes: the modeling system executing the first MRM module responsive to an execute API request (S224). In some embodiments, the S240 includes: the modeling system providing results of the execution of the first MRM module to an external system (e.g., one of 101, 199, 103, 104, 105 of FIG. 1) responsive to execution of the first MRM module. In some embodiments, the modeling system provides results of the execution of the first MRM module to an external system (e.g., one of 101, 199, 103, 104, 105 of FIG. 1) via the API 110 of the modeling system.

In some embodiments, S210 includes generating at least a first model scoring module (e.g., 426 of FIG. 4). In some embodiments, generating a model scoring module includes storing configuration information and metadata for the scoring module in the repository 102. In some embodiments, the repository 102 includes a knowledge graph (as described herein), and generating a model scoring module includes generating a node in the knowledge graph, wherein the knowledge graph node includes metadata specifying a definition of input data used by the model scoring module, and a definition of output data generated by the model scoring module. In some embodiments, configuration information and metadata for the first model scoring module includes at least one of: metadata created during development of a model of the first model scoring module, and metadata created during deployment of the model of the first model scoring module. In some embodiments, configuration information and metadata for the first model scoring module includes a distribution of values of at least one data field of the training data used to train the model of the first model scoring module. In some embodiments, configuration information and metadata for the first model scoring module includes a distribution of values of at least one data field of the validation data used to validate the model of the first model scoring module. In some embodiments, configuration information and metadata for the first model scoring module includes a distribution of values of at least one data field of the production data used to validate the model of the first model scoring module. In some embodiments, configuration information and metadata for the first model scoring module includes a distribution of values of at least one data field of the production data used by the model of the first model scoring module in a production environment.

In some embodiments, configuration information and metadata for the first model scoring module includes structured information about model performance projection and analysis for the model of the first model scoring module.

In some embodiments, configuration information and metadata for the first model scoring module includes at least one of information indicating whether values of at least one input variable (or feature) are consistently available across segments, information indicating whether input variables are too highly correlated with the target, and information indicating whether input variables contain significant anomalies in the distributions of their values over time and across training and validation datasets.

In some embodiments, configuration information and metadata for the first model scoring module includes at least one of information indicating whether values for engineered features are consistently available across segments, information indicating whether engineered features are too highly correlated with the target, and information indicating whether engineered features contain significant anomalies in the distributions their values over time and across training and validation datasets.

In some embodiments, configuration information and metadata for the first model scoring module includes distributions of values of input data sets used in the model of the first model scoring module. In some embodiments, configuration information and metadata for the first model scoring module includes distributions of values of engineered features used in the model of the first model scoring module.

In some embodiments, configuration information and metadata for the first model scoring module includes information of the model of the first model scoring model that indicate at least one of: input requirements of the model, distributions of input variables of the model, feature distributions of the model, score distributions of the model, and business outcomes of the model.

Generating a Modeling Workflow

In some embodiments, S210 includes: receiving at least one workflow API request received via an API (e.g., 110), and processing each workflow API request to generate the workflow. In some embodiments, each workflow API request is a request to add a module (e.g., 122-130) to the workflow. In some embodiments, each workflow API request is a request to generate a module (e.g., 122-130) to be added to the workflow. In some embodiments, generating a module of the workflow includes: storing configuration information and metadata for the module in the repository 102. In some embodiments, the repository 102 includes a knowledge graph (as described herein), and generating a module includes generating a node in the knowledge graph, wherein the knowledge graph node includes metadata specifying a transformation (or process) performed by the module, a definition of input data used by the module, and a definition of output data generated by the module. In some embodiments, the knowledge graph stores information about edges connecting nodes in the knowledge graph, wherein each node represents a module of the workflow. In some embodiments, the knowledge graph stores information about modules (nodes), attributes, and labeled edges describing model variables, transformations, and outputs.

In some embodiments, each API request to generate a module specifies a transformation (or process) performed by the module, a definition of input data used by the module, and a definition of output data generated by the module. In some embodiments, each API request to generate a module specifies a module template that identifies a transformation (or process) performed by the module, a definition of input data used by the module, and a definition of output data generated by the module. In some embodiments, each API request to generate a module specifies a module template that identifies a transformation (or process) performed by the module, a definition of input data used by the module, and a definition of output data generated by the module, and the API request also specifies configuration for the module. In some embodiments, an API request to generate a module specifies at least one module coupled to an input of the module to be generated. In some embodiments, an API request to generate a module specifies at least one module coupled to an output of the module to be generated.

In some embodiments, generating the workflow (S210) includes receiving at least one API request that specifies at least one coupling between an input of a first module of the workflow and an output of a second module of the workflow. In some embodiments, an input of a first model is coupled to an output of a second model by storing meta-data in the knowledge graph node for the first module that specifies an API resource of the output of the second model.

In some embodiments, after processing each workflow generation API request by the modeling system 101, the knowledge graph of the repository 102 stores a graph of nodes representing the workflow, wherein each node of the graph of the workflow represents a module of the workflow, and wherein each edge of the graph represents a coupling between an input of a first module of the workflow and an output of a second module of the workflow.

In some embodiments, execution of model transformations is carried out via execution plans generated based on metadata stored in the knowledge graph.

Workflow Execution

In some embodiments, S220 includes executing a module of the workflow. In some embodiments, S220 includes: executing a module of the workflow responsive to an execute API request received by the API 110; and the modeling system 101 updating the knowledge graph of the workflow in the repository 102 to include metadata generated during execution of the module.

In some embodiments, the module of the execute API request is a module that is a root of the knowledge graph of the workflow. In some embodiments, the module of the execute API request is a module that is a leaf of the knowledge graph of the workflow. In some embodiments, the module of the execute API request is a module that is a node of the knowledge graph of the workflow that is neither a root node nor a leaf node.

In some embodiments, executing the module specified by the execute API request includes ingesting data specified by the input data definition of the module, processing the ingested data by using the transformation defined for the module to produce output data that confirms to the output data definition of the module. In some embodiments, the input data definition specifies a data source (e.g., a root data source or an output of another module of the first modeling workflow) for the data to be ingested by the module.

In some embodiments, metadata generated during execution of a module includes at least one of: labeled nodes and edges describing model variables, the model, a machine-readable representation of the model's computational graph, modeling methods used, training and test data, attributes of training and test data including date (and time) ranges and provenance, feature engineering methods, test descriptions including results, hyperparameters, AUC charts, hold out sets, swap-set analysis, economic impact analysis, approval rate analysis, loss projection analysis, ensembling method, data source and provenance, data ranges, a machine-readable description of feature engineering methods, partial dependence plots, or decompositions.

Figure 5A:
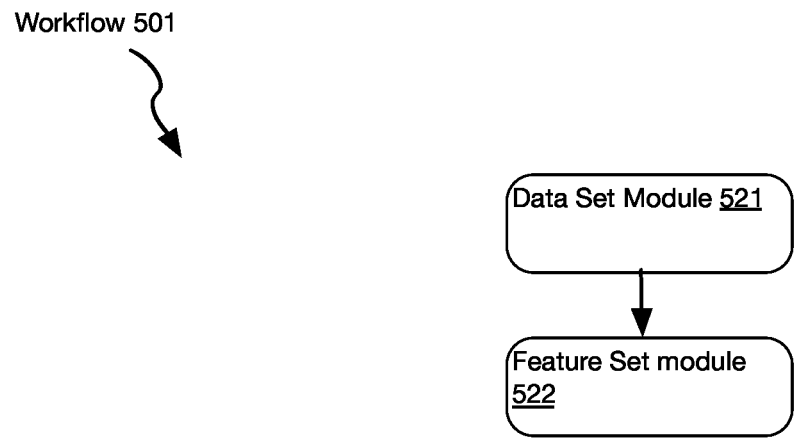
FIG. 5A is a diagram depicting a modeling workflow.
Figure 5B:
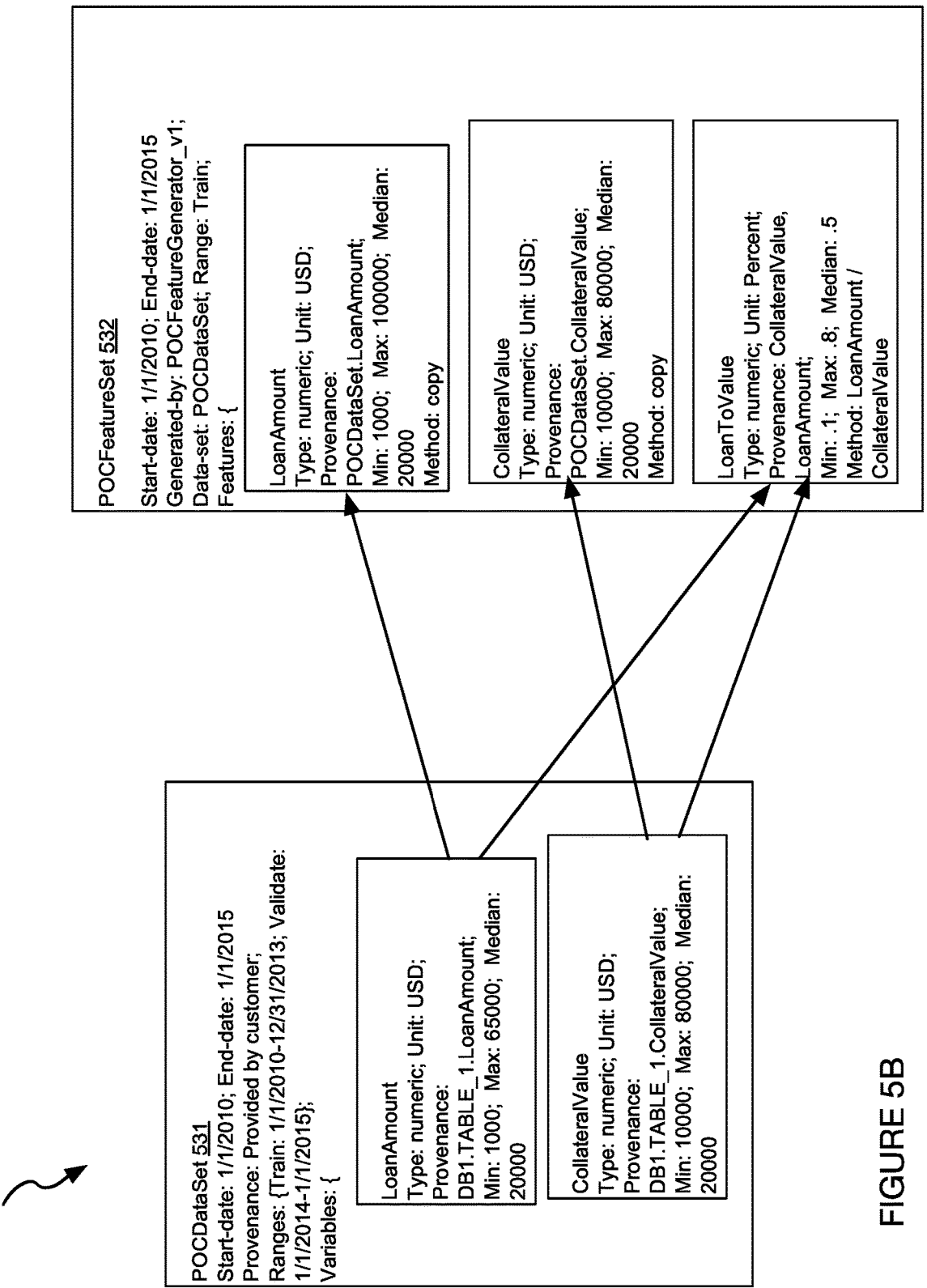
FIG. 5B is a diagram depicting a knowledge graph for the workflow of FIG. 5A, according to embodiments.

FIG. 5A depicts an exemplary modeling workflow 501 that includes a feature set module 522 coupled to data set module 521. FIG. 5B depicts an exemplary knowledge graph generated after generation of the module workflow 501 and execution of the data set module 521 and execution of the feature set module 522. As shown in FIG. 5B, the knowledge graph 502 includes a node 531 for the data set module 521 and a node 532 for the feature set module 522.

Execution of a Training Module

In some embodiments, executing a training module includes ingesting data specified by the input data definition of the module, generating features from the input data, training the model specified by the configuration for the training module by using the ingested data to generate a trained model in accordance with the output data definition for the training module.

In some embodiments, metadata generated during execution of the training module (and stored in the knowledge graph) includes at least one of: labeled nodes and edges describing trained model features and input variables, the trained model, a machine-readable representation of the trained model's computational graph, modeling methods used, training data, attributes of training data including date (and time) ranges and provenance, feature engineering methods, hyperparameters, AUC charts, hold out sets, swap-set analysis, economic impact analysis, approval rate analysis, loss projection analysis, ensembling method, data source and provenance, data ranges, a machine-readable description of feature engineering methods, partial dependence plots, and decompositions.

Execution of a Feature Set Module

In some embodiments, executing a feature set module includes ingesting data specified by the input data definition of the module, generating at least one feature by processing the ingested data using at least one feature generation method. In some embodiments, executing a feature set module includes ingesting data specified by the input data definition of the module and generating a plurality of features, wherein each feature is generated by processing ingested data by using a feature generation method. In some embodiments, the feature set module generates a feature by ingesting data for a single variable of the ingested data. In some embodiments, the feature set module generates a feature by ingesting data for a plurality of variables of the ingested data. In some embodiments, feature generation methods include: a copy method that treats a variable of ingested data as a feature, statistical methods that generate features by performing statistical transformations on ingested data such as: mean, median, principal component analysis, and the like, machine-learning methods that generate features by applying a machine-learning model to ingested data such as: autoencoders, Latent Dirichlet Allocation, including supervised and unsupervised methods, and arithmetic methods that generate features by performing arithmetic transformations on ingested data.

In some embodiments, metadata generated during execution of the feature set module (and stored in the knowledge graph) includes at least one of: start date (and time) of generation of the feature set, end date (and time) of generation of the feature set, an identifier of a feature generator used to generate the feature set, each data set used to generate the feature set, information for each feature generated for the feature set. In some embodiments, for each feature of the feature set, metadata generated during execution of the feature set module (and stored in the knowledge graph) includes at least one of: feature name, data type, provenance, min value, max value, median value, and feature generation method.

Execution of a Data Set Module (Data Source Module)

In some embodiments, executing a data set module includes ingesting data specified by the input data definition of the module, generating at least one variable by processing the ingested data using at least one variable generation method. In some embodiments, executing a data set module includes ingesting data specified by the input data definition of the module and generating a plurality of variables, wherein each variable is generated by processing ingested data by using a variable generation method. In some embodiments, the data set module generates a variable by ingesting data for a single field of raw data of the ingested data. In some embodiments, the data set module generates a variable by ingesting data for a plurality of raw data fields of the ingested data. In some embodiments, the data set module generates a variable by first computing at least one statistic across at least one specified range of input data and then comparing or combining a variable or plurality of variables in at least one input row with a statistic. In some embodiments, variable generation methods include: a copy method that treats a field of ingested raw data as a variable, a conversion method that converts a field of raw data into a variable format, and the like.

In some embodiments, metadata generated during execution of the data set module (and stored in the knowledge graph) includes at least one of: start date (and time) of generation of the data set, end date (and time) of generation of the data set, an identifier of a variable generator used to generate the variable set, each raw data set used to generate the data set, information for each variable generated for the data set. In some embodiments, for each variable of the data set, metadata generated during execution of the data set module (and stored in the knowledge graph) includes at least one of: variable name, data type, provenance, min value, max value, and median value.

Execution of a Data Split Module

In some embodiments, executing a data split module includes ingesting data specified by the input data definition of the module, generating a training data set and a validation data set by splitting the ingested data in accordance with data set configuration. In some embodiments, data set configuration specifies a percentage of rows of the ingested data to be used as training data. In some embodiments, data set configuration specifies selection process for selecting rows of the ingested data to be assigned to the training data set.

In some embodiments, metadata generated during execution of the data split module module (and stored in the knowledge graph) includes at least one of: start date (and time) of generation of the training data set, end date (and time) of generation of the training data set, start date (and time) of generation of the validation data set, end date (and time) of generation of the validation data set, and data set splitting configuration to generate the training data set and the validation data set from the ingested data.

Execution of a Scoring Module

In some embodiments, executing a scoring module includes ingesting data specified by the input data definition of the module, scoring the model specified by the configuration for the scoring module by using the ingested data to generate model scores in accordance with the output data definition for the scoring module.

In some embodiments, metadata generated during execution of the scoring module (and stored in the knowledge graph) includes at least one of: labeled nodes and edges describing scoring model variables, time of execution, duration of execution, the generated scores, submodel scores variable values, and feature values, information about the scoring model, and information about the input data set used by the scoring model.

Execution of an Evaluation Module

In some embodiments, executing an evaluation module includes ingesting data specified by the input data definition of the module, evaluating the model specified by the configuration for the evaluation module by using the ingested data to generate model evaluations in accordance with the output data definition for the evaluation module.

In some embodiments, model evaluation modules include disparate impact evaluation modules. In some embodiments, executing a disparate impact module includes ingesting data specified by the input data definition of the module, evaluating the model specified by the configuration for the disparate impact module by using the ingested data to generate approval rate differences and information identifying any prohibited variables (and features) used by the model that might result in violations of disparate impact regulations and laws. In some embodiments, executing the disparate impact module includes performing a method for generating disparate impact information as described in U.S. application Ser. No. 16/052,293 ("SYSTEMS AND METHODS FOR PROVIDING MACHINE LEARNING MODEL DISPARATE IMPACT INFORMATION"), filed 1 Aug. 2018, Ser. No. 16/297,099 ("SYSTEMS AND METHODS FOR PROVIDING MACHINE LEARNING MODEL EVALUATION BY USING DECOMPOSITION"), filed 8 Mar. 2019, 62/682,714 ("SYSTEMS AND METHODS FOR DECOMPOSITION OF TREE AND DIFFERENTIABLE MODELS"), filed 8 Jun. 2018, and 62/806,603 ("SYSTEMS AND METHODS FOR DECOMPOSITION OF DIFFERENTIABLE AND NON-DIFFERENTIABLE MODELS"), filed 15 Feb. 2019, the contents of each of which are incorporated by reference herein. In some embodiments, metadata generated during execution of the disparate impact module (and stored in the knowledge graph) includes at least one of: a list of variables (and features) used by a model being evaluated by the disparate impact module, a comparison of approval rate or other outcome disaggregated by at least one population segment, variable contribution to disparity in the outcome between segments, variable contribution to the economic outcome of the model, variables identified as possible proxies for a protected class, and a business purpose for at least one identified proxy variable (or feature). In some embodiments, data ingested by the disparate impact module includes: scores generated by the model being evaluated, and respective input data sets, and information about the model being evaluated. In some embodiments, the information about the model includes business rules such as a credit policy.

In some embodiments, model evaluation modules include adverse action evaluation modules. In some embodiments, executing an adverse action module includes ingesting data specified by the input data definition of the module, evaluating a score generated by the model specified by the configuration for the adverse action module for a given input data set by using the ingested data to generate a list of variables and features that were most impactful in determining the score. In some embodiments, the configuration for the adverse action module includes a credit policy. In some embodiments, executing the adverse action module includes performing a method for generating model score explanation information as described in U.S. application Ser. No. 15/970,626 ("SYSTEMS AND METHODS FOR PROVIDING MACHINE LEARNING MODEL EXPLAINABILITY INFORMATION"), filed 3 May 2018, Ser. No. 16/297, 099 ("SYSTEMS AND METHODS FOR PROVIDING MACHINE LEARNING MODEL EVALUATION BY USING DECOMPOSITION"), filed 8 Mar. 2019, 62/682, 714 ("SYSTEMS AND METHODS FOR DECOMPOSITION OF TREE AND DIFFERENTIABLE MODELS"), filed 8 Jun. 2018, and 62/806,603 ("SYSTEMS AND METHODS FOR DECOMPOSITION OF DIFFERENTIABLE AND NON-DIFFERENTIABLE MODELS"), filed 15 Feb. 2019, the contents of each of which are incorporated by reference herein In some embodiments, metadata generated during execution of the adverse action module (and stored in the knowledge graph) includes at least one of: a list of variables (and features) used by a model being evaluated by the adverse action module that were impactful for the score being evaluated; and a textual explanation for each variable (and feature) (or group of variable, group of features, or group of variables and features) deemed to be impactful. In some embodiments, data ingested by the adverse action module includes: scores generated by the model being evaluated, and respective input data sets, and information about the model being evaluated. In some embodiments, information about the model being evaluated includes a credit policy.

In some embodiments, model evaluation modules include fairness evaluation modules. In some embodiments, executing a fairness module includes ingesting data specified by the input data definition of the module, evaluating the model specified by the configuration for the fairness module by using the ingested data. In some embodiments, executing the disparate impact module includes performing a method for determining and/or improving model fairness as described in U.S. Application No. 62/820,147 ("SYSTEMS AND METHODS FOR MODEL FAIRNESS"), filed 18 Mar. 2019, the contents of which is incorporated by reference herein.

In some embodiments, metadata generated during execution of the fairness module (and stored in the knowledge graph) includes at least one of: a list of variables (and features) used by a model being evaluated by the fairness module, a comparison of approval rate or other outcome disaggregated by at least one population segment, variable contribution to disparity in the outcome between segments, variable contribution to the economic outcome of the model, variables identified as possible proxies for a protected class, and a business purpose for at least one identified proxy variable (or feature). In some embodiments, data ingested by the fairness module includes: scores generated by the model being evaluated, and respective input data sets, and information about the model being evaluated. In some embodiments, the information about the model includes business rules such as a credit policy.

Generating a MRM Module

In some embodiments, S210 includes generating a MRM module. In some embodiments, the modeling system (e.g., 110) generates the MRM module in response to receiving an API request to generate the MRM module; the modeling system processes the API request to generate the MRM module. In some embodiments, generating a an MRM module includes storing configuration information and metadata for the module in the repository 102. In some embodiments, the repository 102 includes a knowledge graph (as described herein), and generating a MRM module includes generating a node in the knowledge graph, wherein the node includes metadata specifying a transformation (or process) performed by the MRM module, a definition of input data used by the module, and a definition of output data generated by the module.

In some embodiments, each API request to generate an MRM module specifies a transformation (or process) performed by the module, a definition of input data used by the module (e.g., module outputs, data of knowledge graph nodes, and the like), and a definition of output data generated by the module. In some embodiments, each API request to generate an MRM module specifies a module template that identifies a transformation (or process) performed by the module, a definition of input data used by the module, and a definition of output data generated by the module. In some embodiments, each API request to generate an MRM module specifies a module template that identifies a transformation (or process) performed by the module, a definition of input data used by the module, and a definition of output data generated by the module, and the API request also specifies configuration for the module. In some embodiments, an API request to generate an MRM module specifies at least one module coupled to an input of the MRM module to be generated. In some embodiments, an API request to generate an MRM module specifies at least one module coupled to an output of the MRM module to be generated.

In some embodiments, an API request to generate an MRM module specifies at least one knowledge graph node (of the repository 102) coupled to an input of the MRM module to be generated. In some embodiments, an API request to generate an MRM module specifies at least one knowledge graph node (of the repository 102) coupled to an output of the MRM module to be generated.

In some embodiments, after processing the MRM module generation API request by the modeling system 101, the knowledge graph of the repository 102 stores a node representing the generated MRM module.

In some embodiments, MRM modules (e.g., 129 of FIG. 1) include a data dictionary stability analysis module, a modeling method and optimization module, a pre-launch model safety and compliance module, a model safety and compliance in production module. In some embodiments, MRM modules include a feature stability over time module (e.g., a module corresponding to the knowledge graph node 620 of FIG. 6). In some embodiments, MRM modules include a MRM documentation module (e.g., a module corresponding to the knowledge graph node 802 of FIG. 8).

FIG. 8 depicts a knowledge graph node 820 of an MRM module that is constructed to ingest data of data set node 531 and data of feature set node 532 (of the knowledge graph 502), and generate MRM documentation in accordance with a story template 803. FIG. 9 depicts exemplary MRM documentation generated by the MRM module represented by knowledge graph node 802. FIG. 10 depicts an exemplary story template 803.

Executing an MRM Module

In some embodiments, S221 (executing the MRM module) includes the modeling system executing the MRM module responsive to an execute API request. In some embodiments, S221 includes ingesting data specified by the input data definition of the MRM module, and generating MRM information by using the ingested data in accordance with the output data definition for the MRM module. In some embodiments, the MRM module input data definition (specified by the generated workflow and recorded in the knowledge graph) identifies at least one node of the knowledge graph of the repository 102 (e.g., node 531, 532 of FIG. 5B).

In some embodiments, metadata generated during execution of the MRM module (and stored in the knowledge graph) includes generated MRM documentation. In some embodiments, metadata generated during execution of the MRM module (and stored in the knowledge graph) includes generated MRM documentation, information about ingested data, and information about a story template used by the MRM module to generate the MRM documentation, and a time of MRM document generation.

In some embodiments, S221 (executing the MRM module) includes at least one of: generating a distribution of values of at least one data field of training input data sets used to train a model of the workflow (generated at S210) (S1110 shown in FIG. 11); generating a distribution of values of at least one data field of validation input data sets used to validate the model (S1120); generating a distribution of values of at least one data field of production input data sets used to generate production model outputs (e.g., scores) (S1130); generating a distribution of scores generated by the model for the validation input data sets (S1140); and generating a distribution of scores generated by the model for the production input data sets (S1150).

In some embodiments, the modeling system stores each distribution generated for the workflow in the knowledge graph for the workflow, in association with the node representing the MRM module. In some embodiments, at least one variable distribution is represented as a median value of the corresponding variable (pass through feature, engineered feature). In some embodiments, at least one score distribution is represented as a median score. In some embodiments, at least one variable distribution is represented as a vector that includes a distribution value for each value of the variable, each distribution value indicating a percentage of data sets having the corresponding variable value. In some embodiments, at least one score distribution is represented as a vector that includes a distribution value for each score value of the associated model, each distribution value indicating a percentage of scores having the corresponding score value.

In some embodiments, S221 includes: identifying all variables being used by a model of the workflow (S1101). In some embodiments, S1101 includes identifying the variables by using a knowledge graph generated at S210 for the workflow. In some embodiments, S1101 includes accessing a node (of the knowledge graph) that represents a feature set module (e.g., 532 shown in FIG. 5B). In some embodiments, the knowledge graph identifies the feature set module as an input of the MRM module.

In some embodiments, S221 includes retrieving data sets (S1102). In some embodiments, S1102 includes: the modeling system retrieving at least one of training input data sets, validation input data sets, production input data sets, and hold-out input data sets). In some embodiments, S1102 includes retrieving the data sets by using the knowledge graph (which includes information, e.g., queries, used to retrieve training, validation, and hold out evaluation data, from an associated data file, database, or data store, as applicable). In some embodiments, S1102 includes accessing at least one node (of the knowledge graph) representing a data set module (e.g., 531 shown in FIG. 5B) of the knowledge graph. In some embodiments, the knowledge graph identifies the data set module as an input of the MRM module. In some embodiments, S1102 includes accessing a single data set node. In some embodiments, S1102 includes accessing a plurality of data set nodes to access the requested data sets.

In some embodiments, S221 includes retrieving models scores of the at least one model of the workflow (S1103). In some embodiments, S1103 includes retrieving the data sets by using the knowledge graph (which includes information, e.g., queries, used to retrieve model scores, from an associated data file, database, or data store, as applicable). In some embodiments, S1103 includes accessing at least one node (of the knowledge graph) that records information for scores generated by at least one model of the workflow. In some embodiments, the knowledge graph identifies the node as an input of the MRM module. In some embodiments, S1103 includes accessing a single node. In some embodiments, S1103 includes accessing a plurality of nodes to access the model scores.

In some embodiments, S221 includes: generating MRM information. In some embodiments, generating MRM information includes generating distribution comparison information (S1160).

In some embodiments, S221 includes: generating feature stability information for at least one feature. In some embodiments, generating feature stability information includes generating distribution comparison information (S1160). In some embodiments, feature stability information indicates whether a feature is stable between a first group (subset) of input data sets (e.g., training data sets) and a second group (subset) of input data sets (e.g., validation data sets). In some embodiments, the modeling system determines stability of a feature based on comparison information generated at S1160, as described herein.

In some embodiments, S221 includes: generating feature safety information for at least one feature. In some embodiments, generating feature safety information includes generating distribution comparison information (S1160). In some embodiments, feature safety information indicates whether a shift in distribution of values of a variable (feature) (e.g., as measured by a PSI) between a first group of input data sets (e.g., production data sets within a first sample time period) and a second group of input data sets (e.g., production data sets within a second sample time period) exceeds a threshold value. In some embodiments, the modeling system determines safety of a feature based on comparison information generated at S1160, as described herein.

In some embodiments, S221 includes: generating distribution comparison information (S1160). In some embodiments, the modeling system stores the generated distribution comparison information in the knowledge graph in association with the node representing the MRM module. In some embodiments, S1160 includes: comparing a first distribution with a second distribution. In some embodiments, the modeling system compares the first and second distributions by computing a population stability index.

In some embodiments, the first distribution and the second distribution are represented as a vector that includes a distribution value for each value of the variable, each distribution value indicating a percentage of data sets having the corresponding variable value. In some embodiments, the modeling system compares the first and second distributions for a variable by computing a population stability index (PSI) for each variable value v (e.g., PSI(vi)), and summing the PSIs for each variable value as shown in Equations 1 and 2.

$$PSI(v_i) = (DV_1 - DV_2) * ln(DV_1/DV_2) \quad \text{[Equation 1]}$$

$$PSI = \text{sum}(PSI(v_1), \ldots, PSI(v_n)) \quad \text{[Equation 2]}$$

wherein DV1 is the distribution value of the first distribution and DV2 is the distribution value of the first distribution. In some embodiments, variable values of the variable are binned, and a PSI is computed for each bin, and the PSIs for each bin are summed, as shown in Equations 1 and 2. In some embodiments, binning includes transforming each numeric variable value into a categorical value, and re-grouping and consolidating the categorical values into bins. For example, ages of people can be grouped (binned) into a smaller number of age intervals.

In some embodiments, the modeling system compares the first and second distributions for a variable by computing a median variable value for the first distribution, computing a median value for the second distribution, and determining a difference between the median variable value for the first distribution and the median value for the second distribution.

In some embodiments, the modeling system compares the first and second distributions for a non-numeric variable by performing a Chi-Squared process.

In some embodiments, S1160 is performed by a feature stability module (e.g., corresponding to the knowledge graph node shown in 620 of FIGS. 6 and 7). FIG. 7 depicts a process performed by the feature stability module to compute a PSI and a median vector for each feature identified by the feature set node 532. In some embodiments, the feature stability module is constructed to add each computed PSI and median vector for a feature to the feature set node 532.

In some embodiments, the modeling system compares the first and second distributions by performing steps of the Kolmogorov-Smirnov test.

In some embodiments, the modeling system compares the first and second distributions by computing a median of the first distribution, computing a median of the second distribution, and comparing the two medians.

In some embodiments, the modeling system compares the first and second distributions by computing quantiles of the first distribution, computing quantiles of the second distribution, and comparing the quantiles of the first distribution with quantiles of the second distribution.

In some embodiments, the first distribution is a distribution of values of a variable across training input data sets (e.g., generated at S1110) and the second distribution is a distribution of values of the variable across validation input data sets (e.g., generated at S1120). In some embodiments, the first distribution is a distribution of values of a variable across training input data sets (e.g., generated at S1110) and the second distribution is a distribution of values of the variable across production input data sets (e.g., generated at S1130). In some embodiments, the first distribution is a distribution of values of a variable across validation input data sets (e.g., generated at S1120) and the second distribution is a distribution of values of the variable across production input data sets (e.g., generated at S1130). In some embodiments, the first distribution is a distribution of values of a variable across validation input data sets (e.g., generated at S1120) and the second distribution is a distribution of values of the variable across hold-out input data sets. In some embodiments, the first distribution is a distribution of values of a variable across training input data sets (e.g., generated at S1110) and the second distribution is a distribution of values of the variable across hold-out input data sets. In some embodiments, the first distribution is a distribution of values of a variable across hold-out input data sets and the second distribution is a distribution of values of the variable across production input data sets. In some embodiments, the first distribution is a distribution of values of a variable across production input data sets of a first time period and the second distribution is a distribution of values of the variable across production input data sets of a second time period. In some embodiments, the first distribution is a distribution of values of a variable across training input data sets of a first time period and the second distribution is a distribution of values of the variable across training input data sets of a second time period.

In some embodiments, S1130 includes continuously generating distributions of a variable of production input data sets over time at periodic intervals, and S1160 includes tracking distribution of the variable of the production input data sets over time. In some embodiments, S1130 includes continuously generating a median value for distributions of a variable of production input data sets over time, and S1160 includes tracking the median values of the variable of the production input data sets over time.

In some embodiments, S1160 includes: for at least one variable used by a model of the workflow, training an autoencoder neural network (as described herein) on training input data sets used by the model; processing the validation input data sets by using the trained autoencoder to generate reconstructed validation input data sets; computing a validation MSE (mean squared error), or other suitable metric, for the trained autoencoder between the validation input data sets and the reconstructed validation input data sets; processing production input data sets by using the trained autoencoder to generate reconstructed production input data sets; computing a production MSE for the trained autoencoder between the production input data sets and the reconstructed production input data sets; generating the comparison information by comparing the validation MSE with the production MSE.

In some embodiments, the comparison information generated at S1160 is a numeric score that represents the similarity of production data to data observed in model training of the associated model of the workflow.

In some embodiments, S221 includes: generating MRM documentation (S1170). In some embodiments, S221 includes: generating MRM documentation (S1170) based on generated distribution comparison information (e.g., generated at S1160). In some embodiments, the modeling system generates the MRM documentation in accordance with a story template (e.g., 803 shown in FIG. 8). FIG. 9 depicts exemplary MRM documentation generated by the MRM module. FIG. 10 depicts an exemplary story template 803.

In some embodiments, generating MRM documentation (S1170) includes: generating feature safety information for at least one feature. In some embodiments, the MRM document (e.g., shown in FIG. 9) is generated (e.g., by an MRM module shown in FIG. 8) by using a story template for safety information (e.g., 803 shown in FIG. 10). In some embodiments, the knowledge graph node 820 for the MRM module identifies the following inputs for the MRM module: the feature set module represented by node 532 and the data set module represented by the node 531. In some embodiments, the knowledge graph node 820 for the MRM module identifies a story template (e.g., 803). In some embodiments, the story template 803 includes instructions for accessing the following for each feature identified by the feature set node 532: provenance, name, and method. As shown in FIG. 5B, the feature set node 532 identifies three features: Loan Amount, Collateral Value, and LoanToValue. For LoanAmont, the method is "copy", and the provenance is the "LoanAmount" variable identified by the data set node 531. For CollateralValue, the method is "copy", and the provenance is the "CollateralValue" variable identified by the data set node 531. For LoanToValue, the method is "LoanAmount/CollateralValue", and the provenance is the "LoanAmount" variable and the "CollateralValue" variable identified by the data set node 531.

In some embodiments, the story template 803 includes instructions for computing a PSI value for each feature. In some embodiments, the story template 803 includes instructions for computing a maximum PSI value for each feature. In some embodiments, the story template 803 includes instructions for accessing a PSI threshold value for each feature. In some embodiments, the MRM module executes the story template at periodic intervals, and records the computed PSI values at each interval in the feature set node 532. In some embodiments, the story template 803 includes instructions for: computing a current PSI value for each feature during execution of the story template, retrieving for each feature (e.g., from the feature set node 532) a previously computed PSI value, comparing the current PSI value with the previously computed PSI value for each feature, and adding the result of the comparison to the MRM documentation (e.g., the document shown in FIG. 9).

In some embodiments, the MRM module computes PSI values for each feature identified in the node 532 at periodic intervals, and stores the computed PSI values for each feature in the feature set node 532.

In some embodiments, the MRM module generates comparison information for each feature identified in the node 532 at periodic intervals (S1160), and stores the comparison information for each feature in the feature set node 532. In some embodiments, the MRM module generates a MRM document that includes at least one of the following for at least one feature identified by the feature set node 532: name of the feature, provenance of the feature, method for the feature, comparison information for at least one of the periodic intervals, and information identifying a shift in distribution.

In some embodiments, a monitoring module (e.g., 130) uses the comparison information to generate an alert (e.g, at S223). In some embodiments, the monitoring module accesses the comparison information form the knowledge graph.

In some embodiments, S221 includes: the modeling system (e.g., 101) retrieving the list of all variables being used for modeling from the knowledge graph generated at S210 for the workflow. Retrieving the list of variables from the knowledge graph can include accessing a node representing a feature set module (e.g., 532 shown in FIG. 5B). In some embodiments, the knowledge graph identifies the feature set module as an input of the MRM module.

In some embodiments, during generation of a distribution (e.g., S1110, S1120, S1130, S1140, and S1150) the modeling system retrieves the datasets relevant to generating the distribution from the knowledge graph of the workflow. Retrieving the relevant data sets from the knowledge graph can include accessing a node representing a data set module (e.g., 531 shown in FIG. 5B) of the knowledge graph. In some embodiments, the knowledge graph identifies the data set module as an input of the MRM module.

With respect to distributions of variable values, in some embodiments, the following is recorded in the knowledge graph of the workflow in association with a comparison generated for each variable: the comparison method used to compare the distributions, a quantification of the difference, and the timeframe in which the difference occurred.

With respect to distributions of model scores, in some embodiments, the following is recorded in the knowledge graph of the workflow in association with each set of production input data: the comparison method used to compare the distributions, a quantification of the difference, and the timeframe in which the difference occurred.

In some embodiments, the comparison information (generated at S1160) is stored in a knowledge graph or structured database where inputs, transformations, outputs and metadata related to the comparisons may be stored and associated with each other via labeled edges. In this way, the knowledge graph enables an operator to retrieve a rich, machine-readable description of the full chain of history related to an anomalous result as identified by the comparison information: anomaly detection output is stored in the knowledge graph where it is related to the specific feature and dataset and thresholds/methods used to produce it; the features are mapped to functions used to construct the features from raw input data; and the raw input data is mapped to datasets and databases where the data was retrieved. A model's feature importance and economic impact analysis may also be stored in relation to the anomaly detection output. These machine-readable relations enable new and useful automated analysis and reporting: a query to the knowledge graph may now answer if a detected anomaly matters (is this feature important to the model and what is the economic impact of the anomaly) and how to fix it (it came from this feature which is comprised of these other inputs that come from these data stores using this function to combine them).

In some embodiments, S221 includes ingesting first data of a first set of knowledge graph nodes for a first modeling workflow, ingesting second data of a second set of knowledge graph nodes for a second modeling workflow, and generating MRM documentation by performing comparisons of the first data and the second data. In some embodiments, the first data includes data generated during execution of the first modeling workflow, and the second data includes data generated during execution of the second modeling workflow.

In some embodiments, the generated MRM documentation includes at least one of fair lending documentation, model comparison information, sensitivity analysis information, feature importance information, unexpected input data information, unexpected score information, an adverse action reason code mapping, variable safety analysis information, model performance over time information, economic analysis information, and segment analysis information. In some embodiments, the generated MRM documentation includes variables, engineered features, and features selected to be used in the model of the associated workflow. In some embodiments, the MRM documentation is generated based on a user-configurable template. In some embodiments, the user-configurable template includes static content and dynamic content generated based on data stored in a data store (e.g., the knowledge graph, another data store, etc.).

Modeler Task Module

In some embodiments, the modules 120 includes a modeler task module that performs a modeling task when executed. In some embodiments, module task modules are constructed to ingest data from at least one node of the knowledge graph of the repository 102 and generate output by performing a modeler task. FIG. 6 depicts a modeler task module (e.g., a module corresponding to the knowledge graph node 620 shown in FIG. 6) that is constructed to ingest data from the knowledge graph node 532 (which includes data of a feature set generated by the feature set module 522 of FIG. 5A).

Executing a Monitoring Module

In some embodiments, S223 (executing a model monitoring module) includes using the comparison information (generated at S1160, and stored in the knowledge graph) to generate an alert. In some embodiments, a monitoring module (e.g., 130) accesses the comparison information form the knowledge graph. In some embodiments, S223 includes: generating an alert if the comparison information satisfies an alert condition.

In some embodiments, S240 includes: the modeling system providing the generated alert to an external system. In some embodiments, the alert is one or more of an alert email and an alert text message. In some embodiments, other alert mechanisms are used to provide the generated alert to the external system.

In some embodiments, S223 includes using the comparison information (generated at S1160) that is stored in the knowledge graph to monitor operation of a model of the workflow in a production environment to identify anomalies in the model's operation. In some embodiments, monitored anomalies include one or more of: unexpected input data, and unexpected output scores.

In some embodiments, S223 includes: identifying unexpected input data in production input data sets in response to detecting a change in distribution of values for a feature, based on comparison information stored in the knowledge graph for the feature. In some embodiments, in a case where a large shift in median value for a variable of production input data is detected, as indicated by a comparison of median values for the variable computed over time, an alert is generated to indicate likelihood of an anomaly in input data.

In some embodiments, S223 includes: detecting unexpected input data during processing of the workflow. In some embodiments, detecting unexpected input data during processing of the workflow includes: during execution of the model scoring module (of the workflow) by the modeling system, and for each feature of production data sets used by the model scoring module: automatically comparing a production distribution of feature values with a reference distribution of feature values for the feature, and in a case where results of a comparison satisfy an alert condition, providing an alert to an external system that indicates detection of unexpected input data. In some embodiments, detecting unexpected input data includes identifying each feature by accessing a knowledge graph node of a feature set module of the knowledge graph. In some embodiments, the modeling system generates each production distribution of feature values and generates each reference distribution of feature values, and stores each production distribution of feature values and each reference distribution of feature values in the knowledge graph in association with the model scoring module. In some embodiments, each production distribution is a distribution of feature values within a first subset of production data sets used by the model scoring module, and each reference distribution is a distribution of feature values within a second subset of production data sets used by the model scoring module. In some embodiments, each reference distribution is a distribution of feature values within a validation data set used to validate the model scoring module. In some embodiments, each reference distribution is a distribution of feature values within a training data set used to train the model scoring module.

In some embodiments, S223 includes: identifying unexpected model scores for production input data sets in response to detecting a change in distribution of model scores values for the model, based on comparison information stored in the knowledge graph for the model. In some embodiments, in a case where a large shift in median value for model score values of the model for production input data is detected, as indicated by a comparison of median values for the model scores computed over time, an alert is generated to indicate likelihood of an anomaly in model scores.

In some embodiments, S223 includes: detecting unexpected scores during processing of the workflow. In some embodiments, detecting unexpected scores during processing of the workflow includes: during execution of a model scoring module (of the workflow) by the modeling system, automatically comparing a production distribution of scores with a reference distribution of scores, and in a case where results of the comparison satisfy an alert condition, providing an alert to an external system that indicates detection of an unexpected score. In some embodiments, the modeling system generates the production distribution of scores and generates the reference distribution of scores, and stores the production distribution of scores and the reference distribution of scores in the knowledge graph in association with the model scoring module. In some embodiments, the reference distribution of scores is a distribution of scores generated by the model scoring module for a validation data set. In some embodiments, the production distribution of scores is a distribution of scores generated by the model scoring module for a first subset of production input data sets, wherein the reference distribution of scores is a distribution of scores generated by the model scoring module for a second subset of production input data sets.

By virtue of the foregoing, the modeling system generates insights into model safety in production, based on the expectations generated during the modeling process and recorded in a knowledge graph as structured metadata.

8. System Architecture

Figure 3:
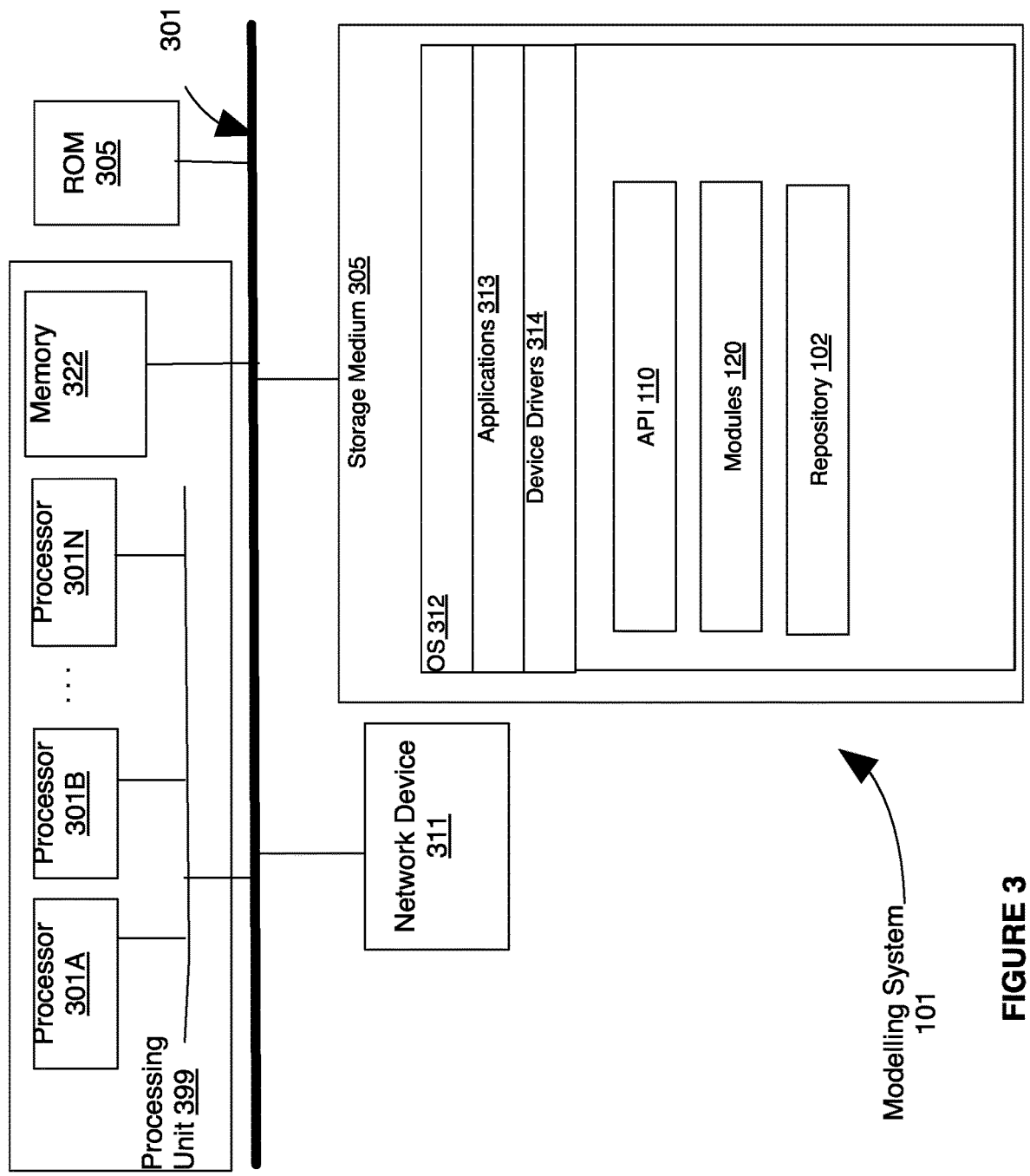
FIG. 3 is a diagram depicting system architecture of a modeling system, according to embodiments.

FIG. 3 is a diagram depicting system architecture of a model evaluation system, according to embodiments.

In some embodiments, the system of FIG. 3 is implemented as a single hardware server device. In some embodiments, the system of FIG. 3 is implemented as a plurality of hardware devices.

In some embodiments, the bus 301 interfaces with the processors (301A-N), the main memory (322) (e.g., a random access memory (RAM)), a read only memory (ROM) (305), a processor-readable storage medium (305), and a network device (311). In some embodiments, bus 301 interfaces with at least one of a display device and a user input device.

In some embodiments, the processors include one or more of an ARM processor, an X86 processor, a GPU (Graphics Processing Unit), and the like. In some embodiments, at least one of the processors includes at least one arithmetic logic unit (ALU) that supports a SIMD (Single Instruction Multiple Data) system that provides native support for multiply and accumulate operations.

In some embodiments, at least one of a central processing unit (processor), a GPU, and a multi-processor unit (MPU) is included.

In some embodiments, the processors and the main memory form a processing unit 399. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some embodiments, the processing unit includes at least one arithmetic logic unit (ALU) that supports a SIMD (Single Instruction Multiple Data) system that provides native support for multiply and accumulate operations. In some embodiments the processing unit is a Central Processing Unit such as an Intel Xeon processor. In other embodiments, the processing unit includes a Graphical Processing Unit such as NVIDIA Tesla.

The network adapter device provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system 312, application programs 3134, and device drivers 314) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium includes machine-executable instructions (and related data) for an operating system 312, software programs 313, device drivers 314, the API 110, the modules 120, and the repository 102.

9. Machines

The systems and methods of some embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

10. Conclusion

As a person skilled in the art will recognize from the previous detailed description and from the figures and claims, modifications and changes can be made to the embodiments disclosed herein without departing from the scope defined in the claims.

What is claimed is:

1. A method implemented by a modeling system and comprising:

detecting one or more unexpected scores during validation of a model before deploying the model in a production environment, comprising:

comparing a validation distribution of scores with a reference distribution of scores, wherein the validation distribution of scores is generated by the model for a validation input data set and the reference distribution of scores is generated by the model for a test input data set;

determining whether an alert condition is satisfied based on a shift of a plurality of median model score values in the validation distribution of scores, wherein the shift is identified based on the comparison; and providing an alert when the alert condition is determined to be satisfied, wherein the alert indicates detection of the one or more unexpected scores.

2. The method of claim 1, wherein the reference distribution of scores comprises, for each of a plurality of score values, a vector comprising a distribution value indicating a portion of the scores in the reference distribution of scores that have one of the score values.

3. The method of claim 1, further comprising generating a population stability index (PSI), or performing a Kolmogorov-Smirnov test, using the validation distribution of scores and the reference distribution of scores to determine whether to provide the alert.

4. The method of claim 1, further comprising storing in a structured database model documentation generated based on metadata collected during processing of a workflow associated with the model, wherein the model documentation comprises one or more of fair lending documentation, a model comparison, a sensitivity analysis, feature importance data, unexpected input data information, unexpected score information, or an adverse action reason code mapping.

5. A modeling system, comprising memory having instructions stored thereon and one or more processors coupled to the memory and configured to execute the stored instructions to:

detect an unexpected score during execution of a model in a production environment, comprising:

compare a production distribution of first scores, which are generated by the model during the execution of the model in the production environment during a first time period, with a reference distribution of second scores, which are generated by the model during the execution of the model in the production environment during a second time period prior to the first time period;

determine whether to provide an alert based on a shift of a plurality of median model score values in the production distribution of first scores, wherein the shift is identified based on the comparison; and selectively provide the alert to an external system based on the determination, wherein the alert indicates detection of the unexpected score.

6. The modeling system of claim 5, wherein the reference distribution comprises, for each of a plurality of score values, a vector comprising a distribution value indicating a portion of the second scores that have one of the score values.

7. The modeling system of claim 5, wherein the one or more processors are further configured to execute the stored instructions to generate a population stability index (PSI), or performing a Kolmogorov-Smirnov test, using the production distribution and the reference distribution to determine whether to provide the alert to the external system.

8. The modeling system of claim 5, wherein the one or more processors are further configured to execute the stored instructions to store in a structured database model documentation generated based on metadata collected during processing of a workflow associated with the model.

9. The modeling system of claim 8, wherein the model documentation comprises one or more of fair lending documentation, a model comparison, a sensitivity analysis, feature importance data, unexpected input data information, unexpected score information, or an adverse action reason code mapping.

10. A non-transitory computer readable medium having stored thereon instructions comprising executable code that, when executed by one or more processors, causes the one or more processors to:

for each of a plurality of score, generate a reference distribution of score values, wherein the reference distribution of score values comprises, for each of the score values, a vector comprising a distribution value indicating a percentage of the plurality of reference input data sets having the score value; and detect an unexpected score during execution of the model, comprising, for each score of one or more production input data sets used by the model:

compare a production distribution of score values for the score with the reference distribution of score values for the score wherein the production distribution of score values comprises a plurality of median model scores values;

identify a shift of at least one of the median model score values based on the comparison; and provide an alert to an external system, wherein the alert indicates detection of the unexpected score.

11. The non-transitory computer readable medium of claim 10, wherein the production distribution of score values is a distribution of scores within a first subset of the production input data sets and the reference distribution of scores is another distribution of scores within a second subset of the production input data sets.

12. The non-transitory computer readable medium of claim 10, wherein the reference distribution of score values is within each of a plurality of data sets used to validate or train the model.

13. The non-transitory computer readable medium of claim 10, wherein the executable code, when executed by the one or more processors, further causes the one or more processors to generate a population stability index (PSI), or performing a Kolmogorov-Smirnov test, using the production distribution of score values and the reference distribution of score values to determine whether to provide the alert to the external system.

14. The non-transitory computer readable medium of claim 10, wherein the executable code, when executed by the one or more processors, further causes the one or more processors to store in a structured database model documentation generated based on metadata collected during processing of a workflow associated with the model.

15. The non-transitory computer readable medium of claim 14, wherein the model documentation comprises one or more of fair lending documentation, a model comparison, a sensitivity analysis, feature importance data, unexpected input data information, unexpected score information, or an adverse action reason code mapping.

* * * * *